US012700363B2

(12) United States Patent
Zhai

(10) Patent No.: US 12,700,363 B2
(45) Date of Patent: *Aug. 4, 2026

(54) PIXEL DRIVING CIRCUIT, DISPLAY PANEL AND DRIVING METHOD THEREOF, AND DISPLAY DEVICE

(71) Applicant: Tianma Advanced Display Technology Institute (Xiamen) Co., Ltd., Xiamen (CN)

(72) Inventor: Yingteng Zhai, Xiamen (CN)

(73) Assignee: Tianma Advanced Display Technology Institute (Xiamen) Co., Ltd., Xiamen (CN)

(*) Notice: Subject to any disclaimer, the term of this patent is extended or adjusted under 35 U.S.C. 154(b) by 0 days.

This patent is subject to a terminal disclaimer.

(21) Appl. No.: 19/040,373

(22) Filed: Jan. 29, 2025

(65) Prior Publication Data

US 2025/0174197 A1 May 29, 2025

Related U.S. Application Data

(63) Continuation of application No. 18/379,021, filed on Oct. 11, 2023, now Pat. No. 12,236,875.

(30) Foreign Application Priority Data

Jun. 30, 2023 (CN) ......................... 202310798598.2

(51) Int. Cl.

| | |
|---|---|
| *G09G 3/3233* | (2016.01) |
| *G09G 3/20* | (2006.01) |
| *G09G 3/3291* | (2016.01) |

(52) U.S. Cl.

CPC ......... *G09G 3/3233* (2013.01); *G09G 3/2081* (2013.01); *G09G 3/3291* (2013.01); *G09G 2310/0216* (2013.01)

(58) Field of Classification Search

None

See application file for complete search history.

(56) References Cited

U.S. PATENT DOCUMENTS

2007/0052632 A1* 3/2007 Wu ...................... G09G 3/3233 345/76

2022/0101783 A1* 3/2022 Han ......................... G09G 3/32

(Continued)

FOREIGN PATENT DOCUMENTS

CN 113966529 A 1/2022

*Primary Examiner* — Duane N Taylor, Jr.

(74) *Attorney, Agent, or Firm* — KDW FIRM PLLC

(57) ABSTRACT

Provided are a pixel driving circuit, a display panel and a driving method thereof and a display device. The display panel includes multiple light-emitting elements and multiple pixel driving circuits. A pixel driving circuit includes a pulse width modulation module and a data signal terminal, the pulse width modulation module includes a sweep signal terminal and is configured to control light emission duration of a light-emitting element. The display panel further includes multiple sweep signal lines and multiple data signal lines. The multiple sweep signal lines extend along a first direction and are arranged along a second direction, and a sweep signal line is electrically connected to the multiple sweep signal terminals. The multiple data signal lines extend along the second direction and are arranged along the first direction, and a data signal line is electrically connected to the multiple data signal terminals.

20 Claims, 32 Drawing Sheets

(56) References Cited

U.S. PATENT DOCUMENTS

| | | | | |
|---|---|---|---|---|
| 2023/0124542 A1* | 4/2023 | Hwang | G09G 3/32 | 345/204 |
| 2024/0169892 A1* | 5/2024 | Huo | G09G 3/32 | |

* cited by examiner

PIXEL DRIVING CIRCUIT, DISPLAY PANEL AND DRIVING METHOD THEREOF, AND DISPLAY DEVICE

CROSS-REFERENCE TO RELATED APPLICATION

This application is a continuation of U.S. application Ser. No. 18/379,021, which claims priority to Chinese patent application NO. 202310798598.2 filed on Jun. 30, 2023, the disclosures of all of which are incorporated herein by reference in their entireties.

TECHNICAL FIELD

Embodiments of the present disclosure relate to the field of display technology and, in particular, to a pixel driving circuit, a display panel and a driving method thereof, and a display device.

BACKGROUND

With the development of display technology, display panels are increasingly widely used, and accordingly, users have increasing requirements for the display quality of display panels. To satisfy requirements for higher definition, the resolution of display panels is becoming increasingly higher.

To satisfy requirements for driving high-resolution display panels, such as micro light-emitting diode (LED) display panels or organic LED (OLED) panels, driver circuits combining pulse amplitude modulation (PAM) and pulse width modulation (PWM) are widely used in the related art to control the intensity and duration of drive currents, and thus to control the light emission state of light-emitting elements.

However, for the display panel using the driver circuit combining PAM and PWM, voltage drops (IR-drop) exist on the power supply voltage line, resulting in poor display uniformity of the display panel.

SUMMARY

Embodiments of the present disclosure provide a pixel driving circuit, a display panel and a driving method thereof and a display device, so as to reduce voltage drops on the power supply voltage line and improve the uniformity of the display image.

Embodiments of the present disclosure provide a display panel. The display panel includes multiple light-emitting elements and multiple pixel driving circuits, where a pixel driving circuit is electrically connected to a light-emitting element for driving the light-emitting element to emit light.

The pixel driving circuit includes a pulse width modulation module and a data signal terminal, the pulse width modulation module includes a sweep signal terminal and is configured to control light emission duration of the light-emitting element.

The display panel includes multiple sweep signal lines, where the multiple sweep signal lines extend along a first direction and are arranged along a second direction, and a sweep signal lines is electrically connected to sweep signal terminals of multiple pixel driving circuits which are arranged along the first direction.

The display panel further includes multiple data signal lines, where the multiple data signal lines extend along the second direction and are arranged along the first direction, a data signal lines is electrically connected to data signal terminals of multiple pixel driving circuits which are arranged along the second direction, and the data signal line is connected to at least one sweep signal line and is configured to provide a sweep signal for the at least one sweep signal line, where the first direction intersects the second direction.

Embodiments of the present disclosure further provide a display panel. The display panel includes multiple light-emitting elements and multiple pixel driving circuits, where a pixel driving circuit is electrically connected to a light-emitting element for driving the light-emitting element to emit light.

A pixel driving circuit includes a pulse width modulation module and a data signal terminal, the pulse width modulation module includes a sweep signal terminal, and the pulse width modulation module is configured to control light emission duration of a light-emitting element.

The display panel further includes multiple data signal lines, where the multiple data signal lines are arranged along a first direction and extend along a second direction, data signal terminals and sweep signal terminals of multiple pixel driving circuits which are arranged along the second direction are electrically connected to one data signal line, and a data signal line is configured to provide sweep signals for multiple sweep signal terminals in a time division manner, where the first direction intersects the second direction.

Embodiments of the present disclosure further provide a pixel driving circuit. The pixel driving circuit includes a pulse width modulation module, and the pixel driving circuit includes a data signal terminal, where the pulse width modulation module includes a sweep signal terminal.

The pulse width modulation module further includes a first transistor and a second transistor, a first terminal of the first transistor is electrically connected to a fixed potential terminal, a control terminal of the first transistor is electrically connected to a first scan terminal, a second terminal of the first transistor is electrically connected to the sweep signal terminal, a first terminal of the second transistor is electrically connected to the data signal terminal, a second terminal of the second transistor is electrically connected to the sweep signal terminal, and a control terminal of the second transistor is electrically connected to a second scan terminal.

An operation of the pixel driving circuit includes a data writing stage and a light emission stage.

In the data writing stage, the first scan terminal controls the first transistor to be turned on, and the second scan terminal controls the second transistor to be turned off so that a data signal is provided for the data signal terminal.

In the light emission stage, the first scan terminal controls the first transistor to be turned off, and the second scan terminal controls the second transistor to be turned on so that a sweep signal is provided for the sweep signal terminal.

Embodiments of the present disclosure further provide a driving method of a display panel applied to the preceding display panel. The display panel includes N types of display regions, the N types of display regions include an i-th type of display region and a j-th type of display region, and the driving method includes the step described below. During a first time period, light-emitting elements included in the i-th type of display region are controlled to emit light, and during a second time period, light-emitting elements included in the j-th type of display region are controlled to emit light.

The first time period and the second time period are at least partially non-overlapping.

Embodiments of the present disclosure further provide a display device. The display device includes the preceding display panel.

The display panel provided in embodiments of the present disclosure includes multiple light-emitting elements and multiple pixel driving circuits. A pixel driving circuit is electrically connected to a light-emitting element for driving the light-emitting element to emit light. The pixel driving circuit includes a pulse width modulation module and a data signal terminal, the pulse width modulation module includes a sweep signal terminal, and the pulse width modulation module is configured to control light emission duration of the light-emitting element. The display panel further includes multiple sweep signal lines and multiple data signal lines. The multiple sweep signal lines extend along a first direction and are arranged along a second direction, and a sweep signal line is electrically connected to sweep signal terminals of multiple pixel driving circuits which are arranged along the first direction. The multiple data signal lines extend along the second direction and are arranged along the first direction, a data signal line is electrically connected to data signal terminals of multiple pixel driving circuits which are arranged along the second direction. The data signal line is connected to at least one sweep signal line and is configured to provide a sweep signal for the at least one sweep signal line. The first direction intersects the second direction. Multiple sweep signal lines are disposed, so that data signal lines can simultaneously provide sweep signals for multiple pixel driving circuits, and different data signal lines can be controlled to provide sweep signals for different sweep signal lines in the time division manner; thus time-division light emission of light-emitting elements is achieved, the problem of excessive voltage drops on the power supply voltage line caused by simultaneous light emission of all light-emitting elements is avoided, and then the display uniformity is improved.

DETAILED DESCRIPTION

Figure 1:
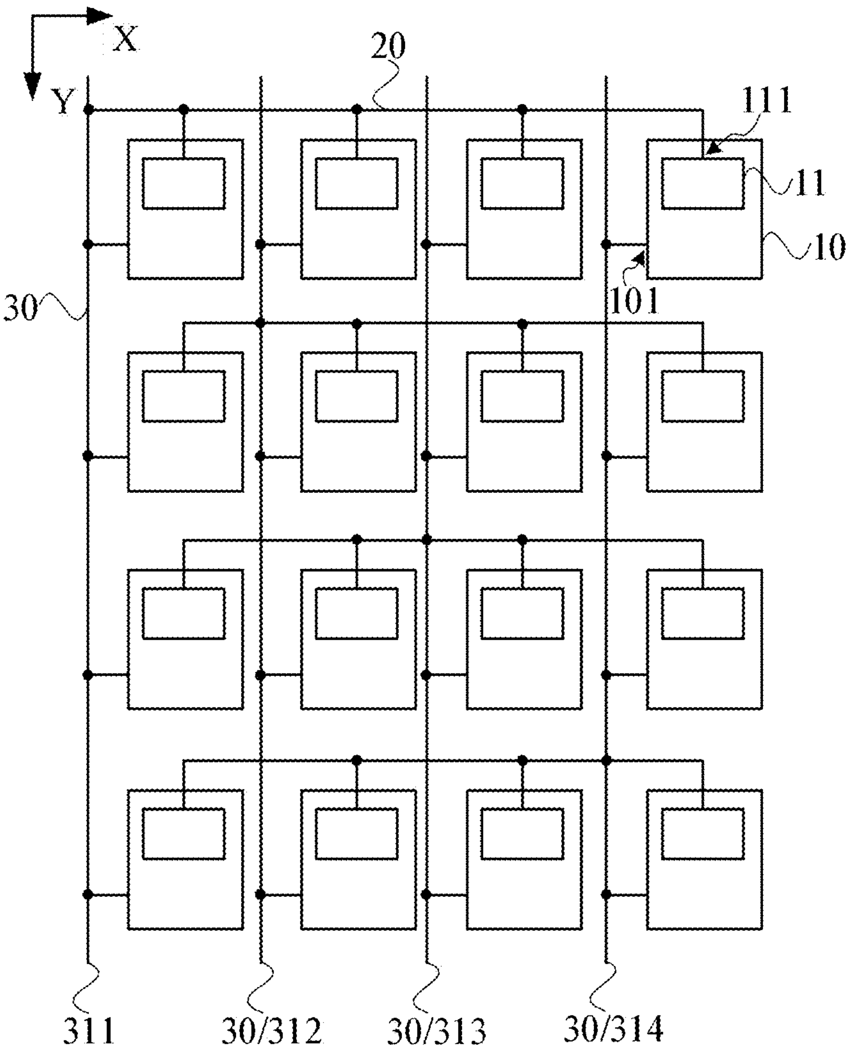
FIG. 1 is a structural diagram of a display panel according to an embodiment of the present disclosure.

Hereinafter the present disclosure will be further described in detail in conjunction with the drawings and embodiments. It is to be understood that the specific embodiments set forth below are intended to illustrate and not to limit the present disclosure. Additionally, it is to be noted that for ease of description, only part, not all, of structures related to the present disclosure are illustrated in the drawings.

Terms used in the embodiments of the present disclosure are intended only to describe specific embodiments and not to limit the present disclosure. It is to be noted that nouns of locality such as "above", "below", "left" and "right" in the embodiments of the present disclosure are described from angles shown in the drawings and are not to be construed as limiting the embodiments of the present disclosure. Additionally, in the context, it is to be understood that when an element is formed "above" or "below" another element, the element can not only be directly formed "above" or "below" the other element but also be indirectly formed "above" or "below" the other element via an intermediate element. Terms such as "first" and "second" are used only for the purpose of description to distinguish between different components and not to indicate any order, quantity or importance. For those of ordinary skill in the art, specific meanings of the preceding terms in the present disclosure may be construed according to specific circumstances.

In the related art, a pixel driving circuit for driving a light-emitting element includes a data signal terminal for receiving data signals and a sweep signal terminal for receiving sweep signals. To save the number of signal lines in the display panel, the data signal terminal and the sweep signal terminal in the pixel driving circuit are connected to the same data signal line, that is, the data signal line is also used as a scan signal line. Data signals and triangle wave sweep signals of each column of pixel driving circuits use one signal line. In a display light emission stage, all signal lines provide the same light emission signal. All data signal lines only provide a set of sweep signals, so that all pixels in the display panel must emit light simultaneously. As a result, serious voltage drops (IR-drop) occur on the power supply voltage line, resulting in poor uniformity of the display panel. As the resolution of the display panel increases, voltage drops on the power supply voltage line in the display panel also increase, leading to poor display uniformity of the display panel. In the display panel that uses a pulse width modulation (PWM) circuit to control the duty cycle of the drive current of the light-emitting element, the light-emitting element is driven by a current, and during the light emission stage, various light-emitting elements emit light simultaneously. As a result, in the light emission stage, drive currents of various pixel driving circuits accumulate in the power supply voltage line; the larger the current in the power supply voltage line, the more serious the voltage drops on the power supply voltage line, so that the uniformity of the display image is affected.

To solve the preceding problem, an embodiment of the present disclosure provides a display panel. The display panel includes multiple light-emitting elements and multiple pixel driving circuits. A pixel driving circuit is electrically connected to a light-emitting element for driving the light-emitting element to emit light. The pixel driving circuit includes a pulse width modulation module and a data signal terminal, the pulse width modulation module includes a sweep signal terminal, and the pulse width modulation module is configured to control light emission duration of the light-emitting element. The display panel further includes multiple sweep signal lines and multiple data signal lines. The multiple sweep signal lines extend along a first direction and are arranged along a second direction, and a sweep signal line is electrically connected to sweep signal terminals of multiple pixel driving circuits which are arranged along the first direction. The multiple data signal lines extend along the second direction and are arranged along the first direction, and a data signal lines is electrically connected to data signal terminals of multiple pixel driving circuits which are arranged along the second direction. The data signal line is connected to at least one sweep signal line and is configured to provide a sweep signal for the at least one sweep signal line. The first direction intersects the second direction.

According to the technical solutions of the embodiment of the present disclosure, multiple sweep signal lines are disposed, so that data signal lines can simultaneously provide sweep signals for multiple pixel driving circuits, and different data signal lines can be controlled to provide sweep signals for different sweep signal lines in a time division manner; thus time-division light emission of light-emitting elements is achieved, the problem of excessive voltage drops on the power supply voltage line caused by simultaneous light emission of all light-emitting elements is avoided, and then the display uniformity is improved.

The above is the core idea of the embodiment of the present disclosure, and specific embodiments of the present disclosure are explained below in conjunction with the drawings. FIG. 1 is a structural diagram of a display panel according to an embodiment of the present disclosure. Referring to FIG. 1, the display panel includes multiple light-emitting elements (not shown in FIG. 1) and multiple pixel driving circuits 10. A pixel driving circuit 10 is electrically connected to a light-emitting element to drive the light-emitting element to emit light. The light-emitting elements may be organic light-emitting diodes (OLED) or micro LEDs that are able to emit light independently, and the specific implementation may be designed according to actual situations. The pixel driving circuit 10 includes a pulse width modulation module 11, the pixel driving circuit 10 includes a data signal terminal 101, the pulse width modulation module 11 includes a sweep signal terminal 111, and the pulse width modulation module 11 is configured to control light emission duration of the light-emitting element. The display panel further includes multiple sweep signal lines 20 and multiple data signal lines 30. The multiple sweep signal lines 20 extend along a first direction X and are arranged along a second direction Y, and a sweep signal line 20 is electrically connected to sweep signal terminals 111 of multiple pixel driving circuits 10 which are arranged along the first direction X. The multiple data signal lines 30 extend along the second direction Y and are arranged along the first direction X, a data signal line 30 is electrically connected to data signal terminals 101 of multiple pixel driving circuits 10 which are arranged along the second direction Y. The data signal line 30 is connected to at least one sweep signal line 20 and is configured to provide a sweep signal for the at least one sweep signal line 20. The first direction X intersects the second direction Y.

The sweep signal line 20 is electrically connected to sweep signal terminals 111 of the multiple pixel driving circuits 10 which are arranged along the first direction X. The pixel driving circuits 10 which are arranged along the first direction X may be understood as multiple pixel driving circuits 10 which are strictly arranged in alignment along the first direction X or multiple pixel driving circuits 10 which are roughly arranged along the first direction X. For example, if a sweep signal line 20 is disposed between two adjacent rows of pixel driving circuits 10, one row of pixel driving circuits 10 which are connected to the sweep signal line 20 and another row of pixel driving circuits 10 which are connected to the sweep signal line 20 may be understood as pixel driving circuits 10 which are arranged along the first direction X.

In the embodiment, the first direction X being a row direction, the second direction Y being a column direction and the number of pixel driving circuits and the number of various signal lines are merely illustrative and are not a limitation on the embodiments of the present disclosure. The principle of the pulse width modulation module 11 controlling the light emission duration of the light-emitting element is as follows. During a light emission time period of the light-emitting element, the sweep signal terminal 111 receives a triangle-wave-shaped ramp signal (that is, a sweep signal) with the voltage value that linearly increases or linearly decreases over time. According to the sweep signal, the pulse width modulation module 11 controls the duty cycle of the drive current provided by the pixel driving circuit 10 for the light-emitting element during the light emission stage so as to control the brightness of the light-emitting element. That is, the larger the duty cycle, the higher the brightness of the light-emitting element perceived by the human eyes; the smaller the duty cycle, the lower the brightness of the light-emitting element perceived by the human eyes. The actual light emission intensity of the light-emitting element is controlled by the magnitude of the drive current.

In the embodiment, sweep signal terminals 111 of multiple pulse width modulation modules 11 are connected to one sweep signal line 20, and the multiple pulse width modulation modules 11 which are connected to the same sweep signal line 20 receive the same sweep signal. For example, in the embodiment shown in FIG. 1, sweep signal terminals 111 in the first row of pixel driving circuits 10 are connected to the first sweep signal line 20 of sweep signal lines 20 which are arranged along the second direction Y, the first sweep signal line 20 is connected to the first data signal line 311 of data signal lines 30 which are arranged along the first direction X; sweep signal terminals 111 in the second row of pixel driving circuits 10 are connected to the second data signal line 312 of the data signal lines 30 which are arranged along the first direction X, and so on. When light-emitting elements are controlled to emit light, data signal lines 30 may be controlled to provide sweep signals for sweep signal lines 20 sequentially. For example, the sweep signals are output sequentially along the first direction X from the first data signal line 311 to the last data signal line 314, so that light-emitting elements are controlled to emit light in different time periods, that is, in the time division manner, and thus the problem of excessive voltage drops on the power supply voltage line caused by simultaneous light emission of all light-emitting elements is avoided.

In an exemplary embodiment, data signal lines 30 include at least two types of data signal lines, and different types of data signal lines 30 provide sweep signals for corresponding sweep signal lines 20 at different times.

Figure 2:
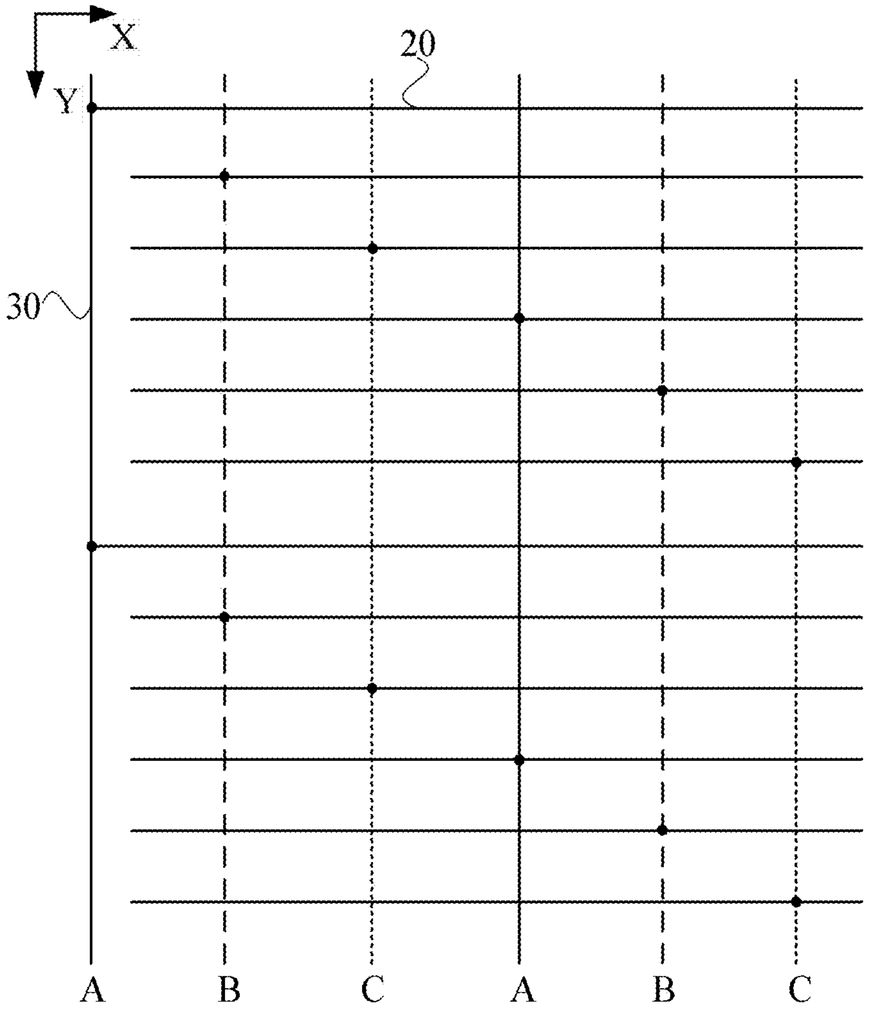
FIG. 2 is a structural diagram of another display panel according to an embodiment of the present disclosure.

It is to be understood that in the embodiment shown in FIG. 1, data signal lines 30 and sweep signal lines 20 are connected in one to one correspondence, that is, one data signal line 30 is one type of data signal line 30. In another embodiment, the number of data signal lines 30 may not be the same as the number of sweep signal lines 20, one data signal line 30 may be connected to at least two sweep signal lines 20, and at least two sweep signal lines 20 which are connected to the same data signal line 30 are disposed at intervals. Multiple data signal lines 30 may be set as one type of data signal lines 30, and at least two types of data signal lines 30 are cyclically disposed. Exemplarily, FIG. 2 is a structural diagram of another display panel according to an embodiment of the present disclosure. Referring to FIG. 2, an example where data signal lines 30 include three types of data signal lines A, B and C is illustrated. Data signal lines 30 are arranged in a cyclic rule of ABC, ABC, . . . , and the number of sweep signal lines 20 is greater than the number of data signal lines 30, so that each data signal line 30 is connected to two sweep signal lines 20. It is to be noted that for simplicity, FIG. 2 does not show the pixel driving circuits and only shows data signal lines 30, sweep signal lines 20 and the connection relationships (solid dots represent electric connections) between the data signal lines 30 and the sweep signal lines 20.

Figure 3:
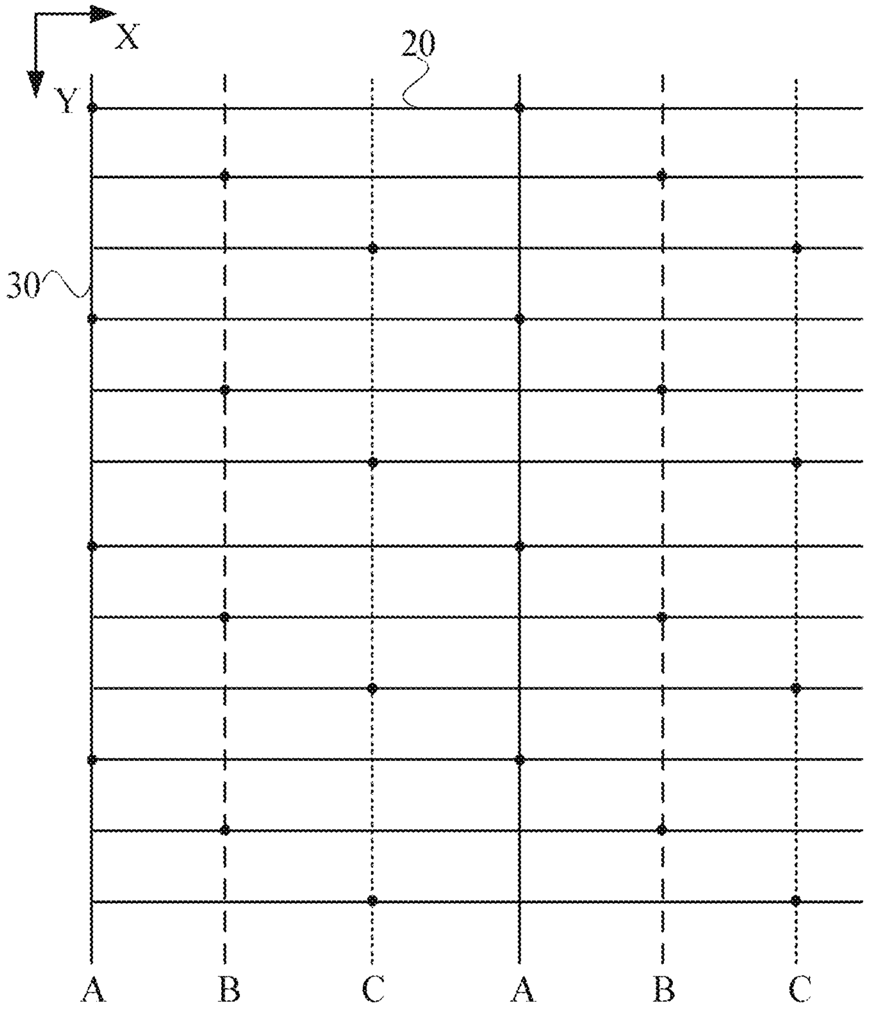
FIG. 3 is a structural diagram of another display panel according to an embodiment of the present disclosure.

In another embodiment, to alleviate the delay problem of signal transmission caused by different lengths of signal transmission paths and thus to improve the consistency of signal transmission, a sweep signal line may be connected to at least two data signal lines (the same type of data signal lines). For example, FIG. 3 is a structural diagram of another display panel according to an embodiment of the present disclosure. Referring to FIG. 3, each sweep signal line 20 is electrically connected to two data signal lines 30 belonging to the same type. The specific implementation may be designed according to actual situations, which is not limited in the embodiment of the present disclosure.

Figure 4:
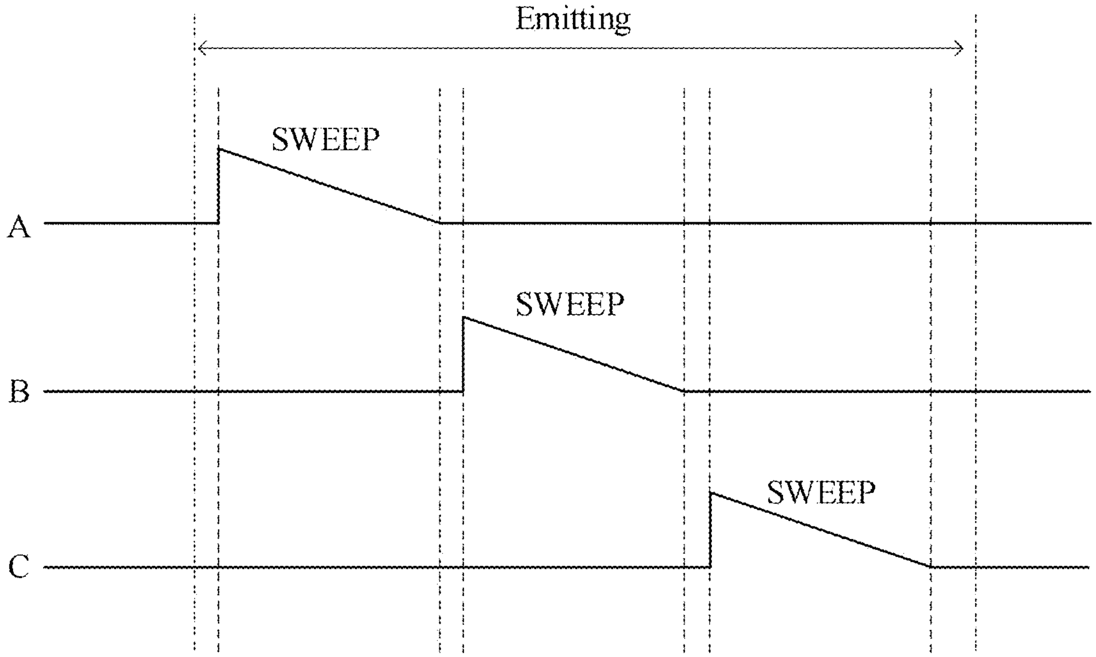
FIG. 4 is a timing diagram of sweep signals according to an embodiment of the present disclosure.

FIG. 4 is a timing diagram of sweep signals according to an embodiment of the present disclosure. Referring to FIG. 4, an example where data signal lines includes three types of data signal lines is illustrated. Three types of data signal lines A, B and C provide corresponding sweep signal lines with sweep signals (SWEEP) at different times, that is, the three sweep signals are at least partially non-overlapping in timing, so that light-emitting elements are controlled to emit light in the time division manner. In an exemplary embodiment, three types of data signal lines A, B, and C provide signals for sweep signal terminals during the light emission stage (Emitting) of the light-emitting elements. A signal provided by a data signal line for a sweep signal terminal includes a signal for constant voltage time period (located before and after the application of SWEEP respectively) and a signal for a ramp voltage time period (SWEEP). That is, different types of data signal lines may provide signals for corresponding sweep signal terminals during the same time period, but the SWEEP signals may appear in the signals at different moments. The three sweep signals shown in FIG. 4 being completely non-overlapping are merely illustrative. In other embodiments, three sweep signals may at least partially overlap, as long as light-emitting elements do not emit light simultaneously. In the embodiment, parameters (such as the amplitude, the duration and the rate of change) of sweep signals are the same. In other embodiments, sweep signals may be provided by difference data signal lines, so that parameters of the sweep signals may be different. In an example, parameters of sweep signals provided by different data signal lines may be different according to different wavelengths of light emitted by light-emitting elements which are driven by the different data signal lines, or parameters of sweep signals provided by different data signal lines may be different according to different transmission distances of the sweep signals in the different data signal lines.

Figure 5:
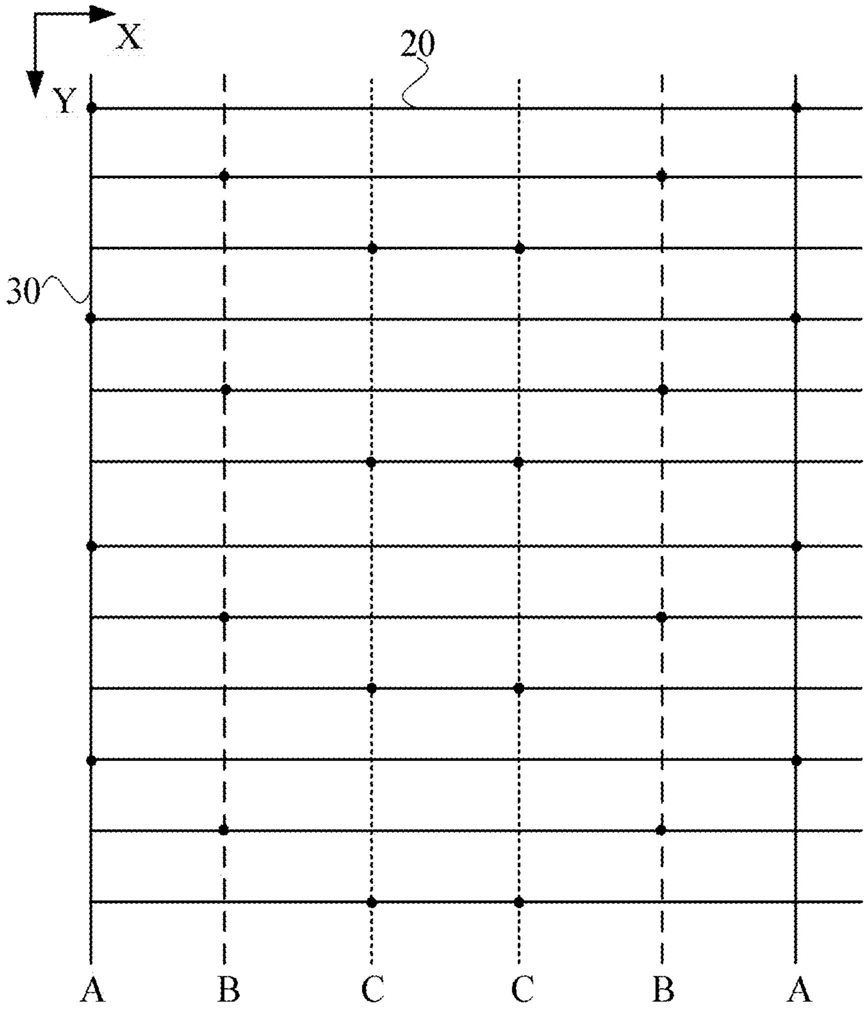
FIG. 5 is a structural diagram of another display panel according to an embodiment of the present disclosure.

FIG. 5 is a structural diagram of another display panel according to an embodiment of the present disclosure. Similar to FIG. 3, the data signal lines 30 in the embodiment include three types of data signal lines A, B and C. Different from FIG. 3, the data signal lines 30 are arranged in a symmetrical manner of ABC, CBA, In other embodiments, the arrangement manner different types of data signal lines may be designed according to actual requirements, which is not limited in the embodiment of the present disclosure.

Figure 6:
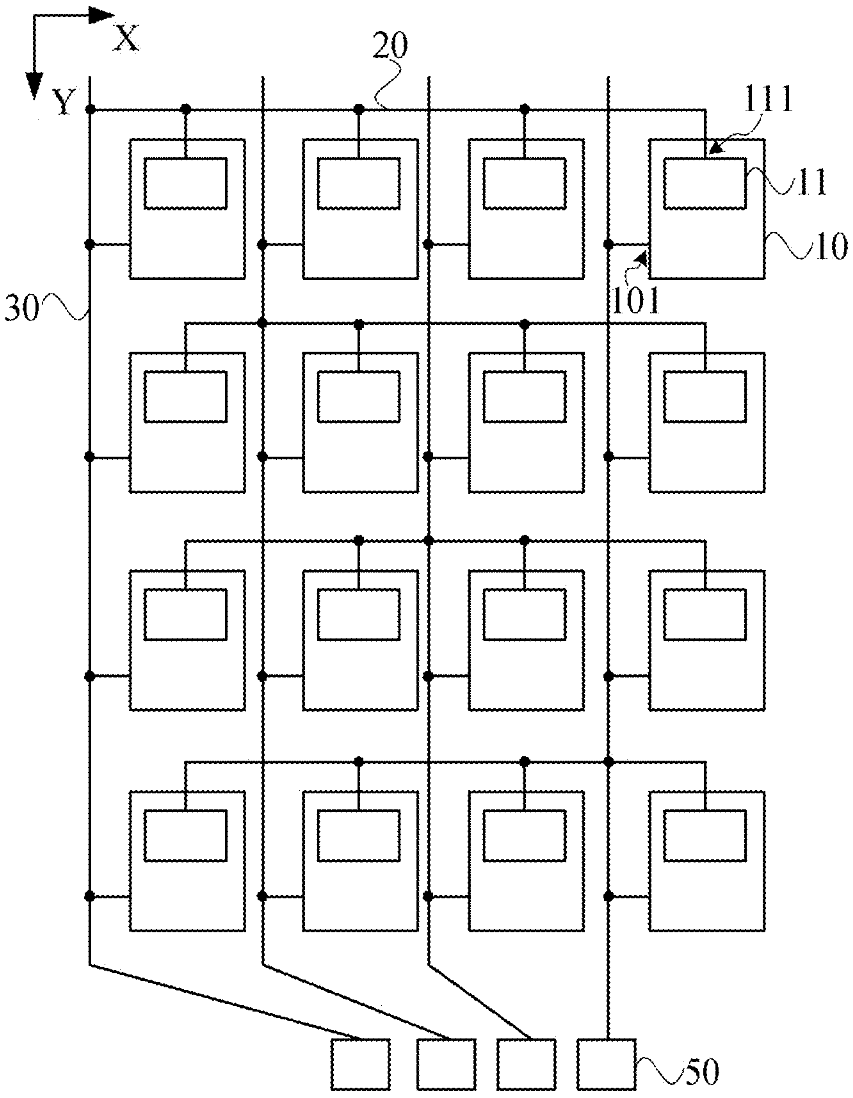
FIG. 6 is a structural diagram of another display panel according to an embodiment of the present disclosure.

FIG. 6 is a structural diagram of another display panel according to an embodiment of the present disclosure. Referring to FIG. 6, the display panel provided in the embodiment further includes multiple signal input terminals 50. A signal input terminal 50 is connected to a data signal line 30 and is configured to provide data signal or sweep signal for the data signal line 30. In an exemplary embodiment, a signal input terminal 50 may be a terminal connected to the output pin of the driver chip for receiving signals provided by the driver chip.

In the preceding embodiment, all data signal lines are electrically connected to corresponding sweep signal lines, that is, all data signal lines are also used for providing sweep signals, which is conducive to the consistency of various sweep signal terminals receiving signals and reducing the signal delay. In another embodiment, in order to reduce the number of signal input terminals and simplify the signal provision manner, only some data signal lines may be used as signal lines for providing sweep signals. In the specific implementation, several data signal lines which are arranged consecutively may be selected, or several data signal lines which are arranged at intervals may be selected, which is not limited in the embodiment of the present disclosure.

Figure 7:
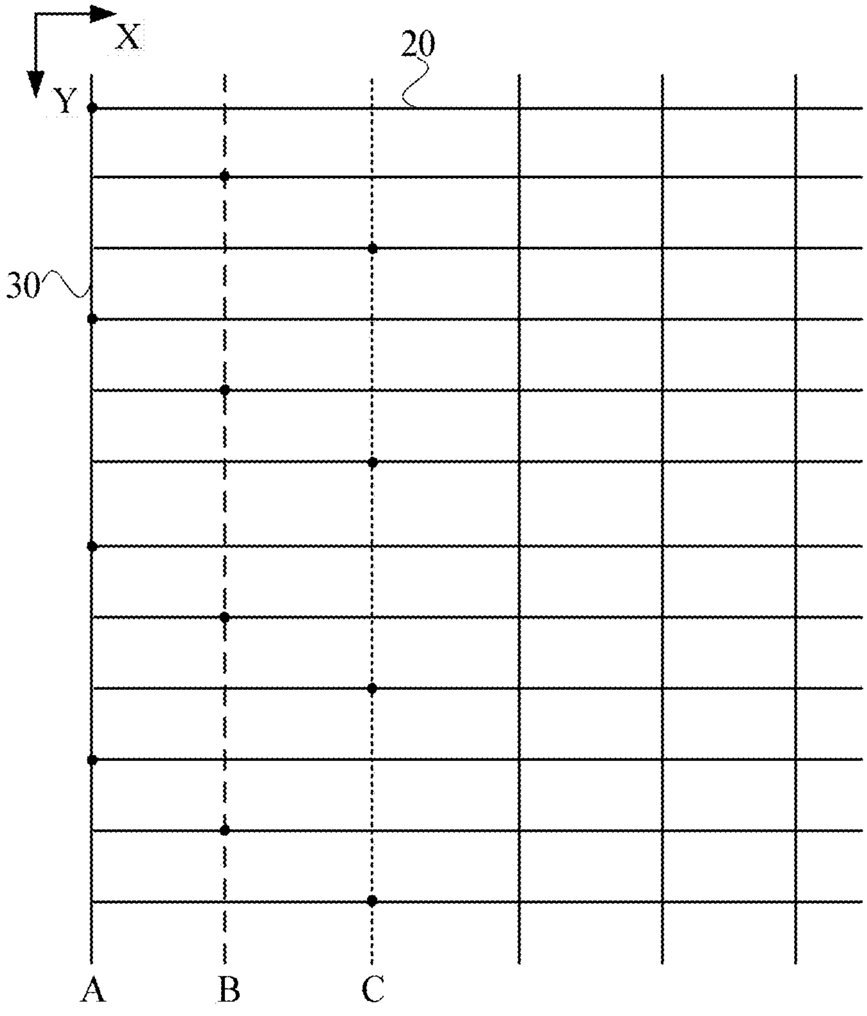
FIG. 7 is a structural diagram of another display panel according to an embodiment of the present disclosure.

An example where data signal lines which are arranged consecutively are selected for providing sweep signals, and data signal lines include three types of data signals is illustrated. FIG. 7 is a structural diagram of another display panel according to an embodiment of the present disclosure. Referring to FIG. 7, in the embodiment, three types of data signal lines A, B and C are provided to be electrically connected to corresponding sweep signal lines 20, and other data signal lines 30 only provide data signals. This setting is conducive to reducing the number of terminals and simplifying the signal driving manner.

In an exemplary embodiment, the display panel includes N types of display regions and M types of data signal lines. The N types of display regions include an i-th type of display region and a j-th type of display region, and the M types of data signal lines include an h-th type of data signal line and a k-th type of data signal line. Sweep signal terminals in pixel driving circuits in the i-th type of display region are electrically connected to the h-th type of data signal line, and sweep signal terminals in pixel driving circuits in the j-th type of display region are electrically connected to the k-th type of data signal line. A time period during which the h-th type of data signal line provides sweep signals for the i-th type of display region and a time period during which the k-th type of data signal line provides sweep signals for the j-th type of display region are at least partially non-overlapping. $N \geq 2$ and N is an integer, $0<i \leq N$, $0<j \leq N$, i and j are integers, and $i \neq j$; $M \geq 2$ and M is an integer, $0<h \leq M$, $0<k \leq M$, h and k are integers, and $h \neq k$.

Exemplarily, with continued reference to FIG. 2, an example where N=M=3 is illustrated. A row of pixel driving circuits shown in FIG. 2 correspond to a display region, and in each display region, sweep signal lines are connected to corresponding data signal lines. Referring to FIG. 4, different types of data signal lines provide different sweep signals, so that light-emitting elements in different display regions can emit light in the time division manner, and thus the problem of excessive voltage drops on the power supply voltage line can be avoided.

In an exemplary embodiment, the display panel includes P display portions, where $P \geq 2$ and P is an integer. The P display portions include a first display portion and a second display portion, the first display portion includes at least one i-th type of display region, the second display portion includes at least one i-th type of display region, and at least one j-th type of display region is provided between the at least one i-th type of display region included in the first display portion and the at least one i-th type of display region included in the second display portion.

Figure 8:
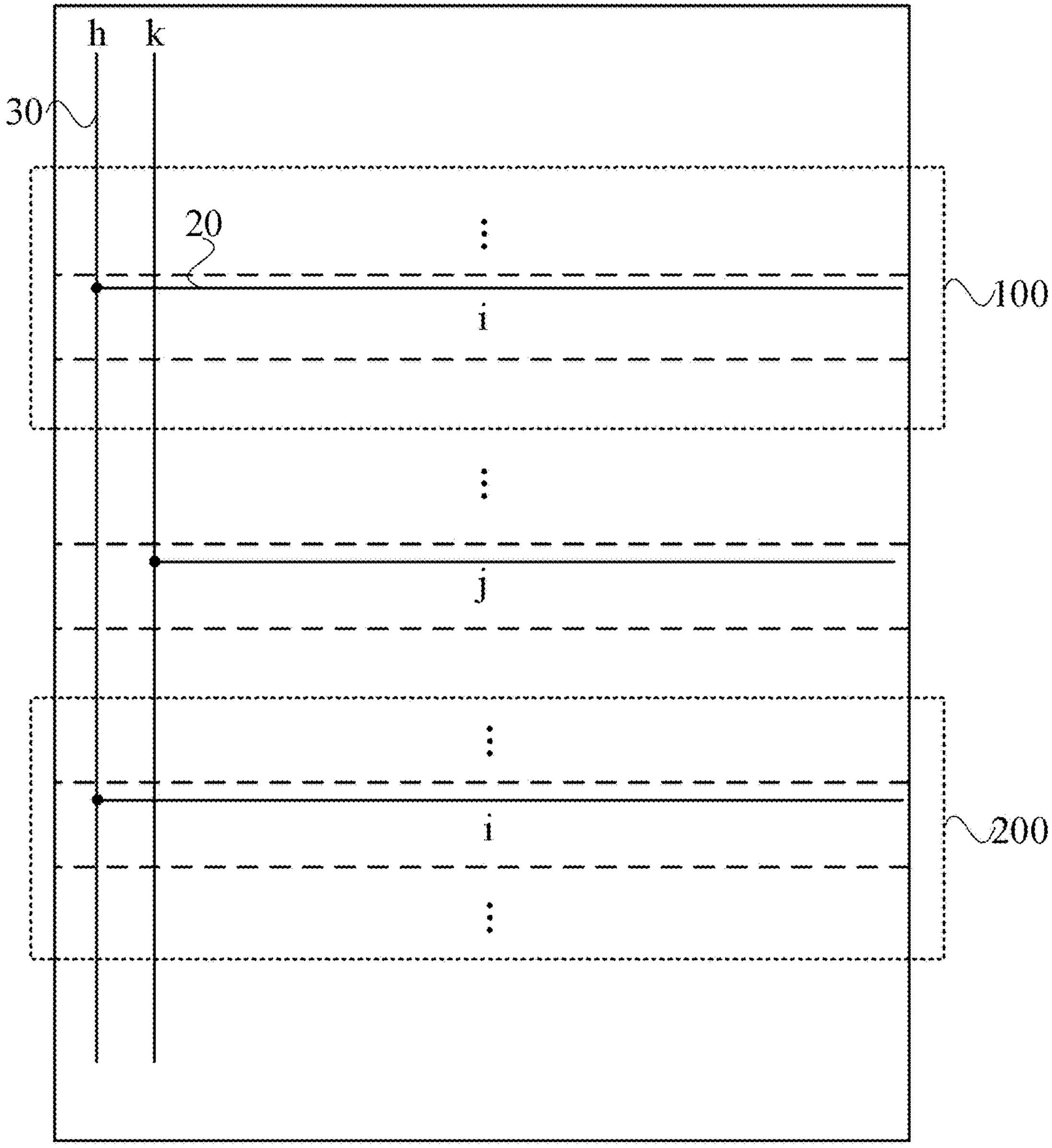
FIG. 8 is a structural diagram of another display panel according to an embodiment of the present disclosure.

FIG. 8 is a structural diagram of another display panel according to an embodiment of the present disclosure. Referring to FIG. 8, the display panel includes N types of display regions, and the N types of display regions include an i-th type of display region and a j-th type of display region. Sweep signal terminals (FIG. 8 only shows sweep signal line) in pixel driving circuits in the i-th type of display region are electrically connected to the h-th type of data signal line, and sweep signal terminals (FIG. 8 only shows the sweep signal lines) in pixel driving circuits in the j-th type of display region are electrically connected to the k-th type of data signal line. It is set that the time period during which the i-th type of display region receives sweep signals and the time period during which the j-th type of display region receives sweep signals are at least partially non-overlapping, that is, light emission time periods of the two types of display regions are at least partially non-overlapping, so that during the same time period, the number of light-emitting elements driven by the power supply voltage line in the display panel is reduced. Therefore, when various light-emitting elements which emit light during the same time period are simultaneously emitting light, the increase in the instantaneous current on the power supply voltage line is reduced, the drive current transmitted on the power supply voltage line is reduced, thus voltage drops on the power supply voltage line are reduced, and the uniformity of the display image is improved.

In an exemplary embodiment, light emission time periods of any two types of display regions of the N types of display regions are at least partially non-overlapping, so that during the same time period, the number of light-emitting elements driven by the power supply voltage line in the display panel is further reduced. Therefore, when various light-emitting elements which emit light during the same time period are simultaneously emitting light, the increase in the instantaneous current on the power supply voltage line is reduced, the drive current transmitted on the power supply voltage line is reduced, thus voltage drops on the power supply voltage line are reduced, and the uniformity of the display image is improved. However, the embodiment of the present disclosure does not limit this case, and the specific implementation may be designed according to actual situations.

It is to be noted that in the embodiment of the present disclosure, the display panel including N types of display regions refers to that the display region of the display panel is divided into N types of display regions according to the light emission time. Light emitting elements located in the same type of display regions have the same light emission time period, that is, light emitting elements located in the same type of display regions have the same light emission start moment and the same light emission end moment. It is to be further noted that in the embodiment, the display panel includes at least two i-th type of display regions and one or more j-th type of display regions, which is not limited in the embodiment of the present disclosure.

In an exemplary embodiment, in the embodiment of the present application, the display panel includes P display portions, where $P \geq 2$ and P is an integer. With continued reference to FIG. 8, the P display portions include a first display portion 100 and a second display portion 200, the first display portion 100 includes at least one i-th type of display region, the second display portion 200 includes at least one i-th type of display region, and at least one j-th type of display region is provided between the at least one i-th type of display region included in the first display portion 100 and the at least one i-th type of display region included in the second display portion 200. That is, in the embodiment of the present disclosure, the i-th type of display regions located in different display portions are spaced by at least one j-th type of display region.

It is to be noted that in the embodiment of the present disclosure, multiple i-th type of display regions are distributed in at least the first display portion and the second display portion, and at least one j-th type of display region is provided between the i-th type of display region included in the first display portion and the i-th type of display region included in the second display portion. In this manner, when the i-th type of display regions emit light, display regions which are emitting light are not concentrated in one region but are distributed in at least two display portions, so that the uniformity of the display image is further improved. In another embodiment, the implementation below may further be included. For example, the display region of the display panel is divided along a specific direction into multiple display sub-regions which are arranged sequentially, and light-emitting elements of various display sub-regions emit light sequentially in the time division manner. Exemplarily, the display region includes n pixel rows and is divided into three display sub-regions. Light emitting elements located in the first pixel row to the (n/3)-th pixel row of the first display sub-region emit light at the same time, light-emitting elements located in the (n/3+1)-th pixel row to the (2n/3)-th pixel row of the second display sub-region emit light at the same time, light-emitting elements located in the (2n/3+1)-th pixel row to the n-th pixel row of the third display sub-region emit light at the same time, and the light-emitting elements in the first display sub-region to the third display sub-region emit light sequentially.

It is to be noted that in the embodiment, the first display portion may include N types of display regions or include some types of display regions of N types of display regions, and the second display portion may include N types display regions or include some types of display regions of N types of display regions, which is not limited in the embodiment of the present disclosure, and flexible selection may be performed in the specific implementation according to actual situations.

It is to be further noted that the same type of display regions included in the first display portion may include one display region or multiple display regions. Similarly, the same type of display regions included in the second display portion may also include one display region or multiple display regions. Moreover, when the same type of display regions included in the same display portion include multiple display regions, the same type of display regions located in the same display portion may be arranged adjacent or not adjacent to each other, which is not limited in the embodiment of the present disclosure.

An example where the first display portion includes N types of display regions, the second display portion includes N types of display regions, and the same type of display regions which are located in the same display portion are arranged adjacent to each other is used for describing the display panel provided in the embodiment of the present disclosure.

In an exemplary embodiment, in an embodiment of the present disclosure, the i-th type of display regions are evenly distributed in the display panel, and the j-th type of display region are evenly distributed in the display panel, so that the uniformity of the display image is further improved; the embodiment of the present disclosure does not limit this case.

In an exemplary embodiment, a start moment when the h-th type of data signal line provides the sweep signals for the i-th type of display region does not overlap a start moment when the k-th type of data signal line provide the sweep signals for the j-th type of display region.

In an example, in an embodiment of the present disclosure, it is set that the start moment of the sweep signals of the i-th type of display region does not overlap the start moment of the sweep signals of the j-th type of display region. Moreover, it may be set that a start moment of a light emission time period of the i-th type of display region does not overlap a start moment of a light emission time period of the j-th type of display region so that the light emission time period of the i-th type of display region and the light emission time period of the j-th type of display region are at least partially non-overlapping. In this manner, the number of light-emitting elements which emit light during the same time period is reduced, the increase in the instantaneous current on the power supply voltage line is reduced, voltage drops on the power supply voltage line are reduced, and the uniformity of the display image is improved.

In an exemplary embodiment, the time period during which the h-th type of data signal line provides the sweep signals for the i-th type of display region does not overlap the time period during which the k-th type of data signal line provides the sweep signals for the j-th type of display region.

In an embodiment of the present disclosure, it is set that a loading time period of the sweep signals of the i-th type of display region does not overlap a loading time period of the sweep signals of the j-th type of display region (for example, as shown in FIG. 4). Similarly, it may be set that the light emission time period of the i-th type of display region does not overlap the light emission time period of the j-th type of display region, so that during the same time period, the number of light-emitting elements driven by the power supply voltage line in the display panel is further reduced, the increase in the instantaneous current on the power supply voltage line is reduced, voltage drops on the power supply voltage line are reduced, and the uniformity of the display image is improved.

In an exemplary embodiment, in an embodiment of the present disclosure, when Nis an integer greater than 2, light emission time periods of different types of display regions in the N types of display regions do not overlap, so that during the same time period, the number of light-emitting elements driven by the power supply voltage line in the display panel is further reduced, the increase in the instantaneous current on the power supply voltage line is reduced, voltage drops on the power supply voltage line are reduced, and the uniformity of the display image is improved. However, the embodiment of the present disclosure does not limit this case, as long as light emission time periods of at least two types of display regions of the N types of display regions do not overlap.

In an example, in an embodiment of the present disclosure, in one display frame (that is, during the display process of one frame of display image), it may be set that the i-th type of display region emits light first, the j-th type of display region emits light later, and the start moment of the light emission time period of the j-th type of display region is not earlier than an end moment of the light emission time period of the i-th type of display region, so that the light emission time period of the i-th type of display region and the light emission time period of the j-th type of display region are completely non-overlapping.

In an embodiment of the present disclosure, when the light emission time period of the i-th type of display region and the light emission time period of the j-th type of display region are completely non-overlapping, in an example, for two types of display regions which have light emission time periods adjacent to each other, a time gap t between the light emission time periods satisfies that 1 μs≤t≤T/2, where T represents duration of one of the light emission time periods.

Exemplarily, the i-th type of display region and the j-th type of display region are two types of display regions of which light emission time periods are adjacent to each other, and the time gap between the light emission time period of the i-th type of display region and the light emission time period of the j-th type of display region is t, that is, the time gap between the end moment of the light emission time period of the i-th type of display region and the start moment of the light emission time period of the j-th type of display region is t, where T represents the duration of one of the light emission time periods. In this manner, in one display frame, light emission time periods of two types of display regions which emit light successively do not overlap, voltage drops on the power supply voltage line are reduced, and the uniformity of the display image is improved. Moreover, the user experience is avoided being affected due to the flickering display image caused by a too long gap between the light emission time periods of two types of display regions which emit light successively.

It is to be noted that the pulse width modulation module is controlled by a corresponding light emission control signal, and a light emission time period refers to an entire time period during which the light emission control signal corresponding to the pulse width modulation module is enabled. In practice, a light-emitting element emits light during part of the light emission time period or the entire light emission time period, and the specific light emission duration is controlled by the corresponding pulse width modulation module. For two types of display regions of which light emission time periods are adjacent to each other, the light emission time periods being at least partially non-overlapping refers to that for the two types of display regions, a start moment of the light emission time period of one type of display regions which emit light first and a start moment of the light emission time period of the other type of display regions which emit light later are not spaced by a light emission time period of another type of display regions. For two types of display regions of which light emission time periods are adjacent to each other, the light emission time periods being completely non-overlapping refers to that for the two types of display regions, an end moment of the light emission time period of one type of display regions which emit light first and a start moment of the light emission time period of the other type of display regions which emit light later are not spaced by a light emission time period of another type of display regions.

In an exemplary embodiment, a change rate of the sweep signal provided by the h-th type of data signal line for the i-th type of display region is different from a change rate of the sweep signal provided by the k-th type of data signal line for the j-th type of display region.

Figure 9:
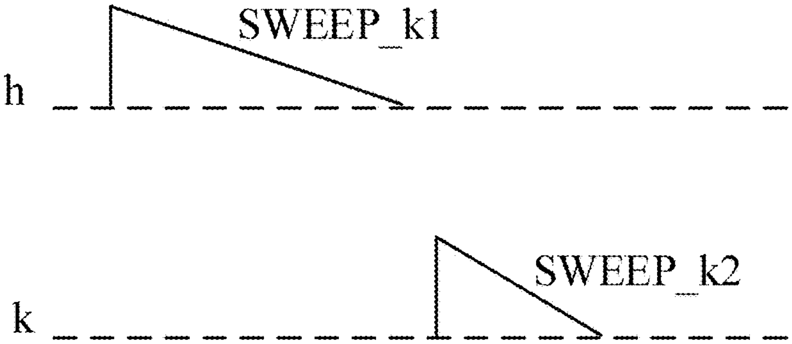
FIG. 9 is a timing diagram of sweep signals according to an embodiment of the present disclosure.

Exemplarily, FIG. 9 is a timing diagram of sweep signals according to an embodiment of the present disclosure. Referring to FIG. 9, curve h represents the sweep signal provided by the h-th type of data signal line for the i-th type of display region, and curve k represents the sweep signal provided by the k-th type of data signal line for the j-th type of display region. Due to the fact that different sweep signals may be provided by different types of data signal lines, when sweep signals are applied, the change rate SWEEP_k1 of the sweep signal provided by the h-th type of data signal line may be different from the change rate SWEEP_k2 of the sweep signal provided by the k-th type of data signal line, and the two sweep signals have the same peak voltage but different loading duration, so that SWEEP_k1≠SWEEP_k2, that is, change rates of the two signals are not equal, and thus requirements for driving different display regions are satisfied. In other embodiments, sweep signals may have different parameters, such as different amplitudes and different duration, and the specific implementation may be designed according to actual situations.

It is to be understood that in the embodiment of the present disclosure, one type of data signal lines may include one data signal line or multiple data signal lines. For example, in the embodiment shown in FIG. 1, it may be considered that one type of data signal lines include one data signal line. During the implementation, it may be set that each data signal line provides different sweep signals to satisfy different display requirements, and the specific implementation may be designed according to actual situations.

In an exemplary embodiment, types of display regions among the N types of display regions which are comprised in the first display portion are the same as types of display regions among the N types of display regions which are comprised in the second display portion, a number of the display regions among the N types of display regions which are comprised in the first display portion is the same as a number of the display regions among the N types of display regions which are comprised in the second display portion, and an arrangement sequence of the types of display regions in the first display portion along the second direction is the same as an arrangement sequence of the types of display regions in the second display portion along the second direction.

Figure 10:
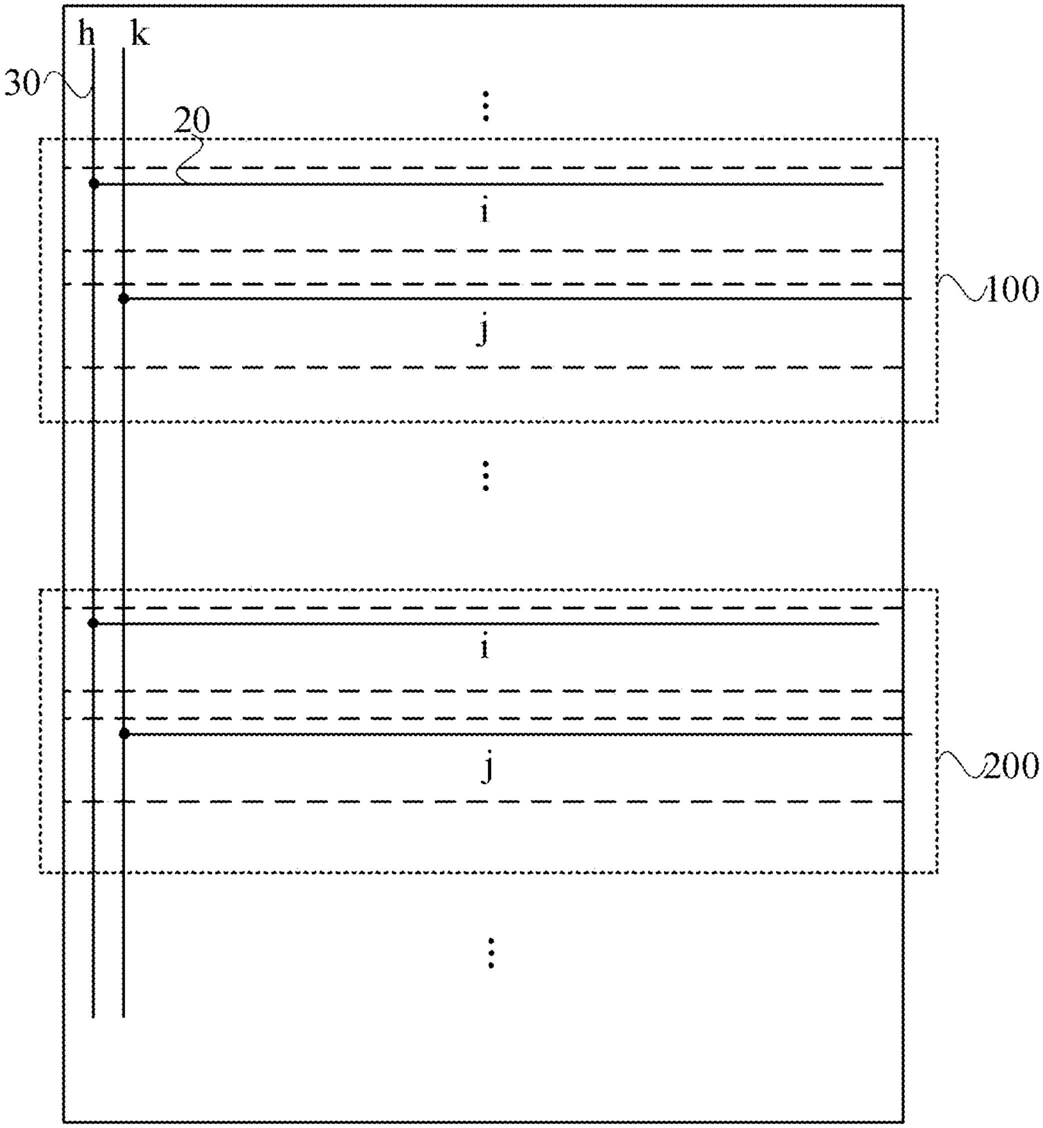
FIG. 10 is a structural diagram of another display panel according to an embodiment of the present disclosure.

When the first display portion includes R types of display regions, the second display portion also includes R types of display regions, where R is any integer not less than 1 and not greater than N. FIG. 10 is a structural diagram of another display panel according to an embodiment of the present disclosure. Referring to FIG. 10, an example where N=2 is illustrated. The first display portion 100 includes two types of display regions, that is, an i-th type of display regions and a j-th type of display region, and the second display portion 200 also includes two types of display regions, that is, an i-th type of display region and a j-th type of display region. The first display portion 100 includes two display regions, that is, one i-th type of display region and one j-th type of display region, and the second display portion 200 also includes two display regions, that is, one i-th type of display region and one j-th type of display region. However, the embodiment of the present disclosure does not limit this case.

An example where the first display portion includes N types of display regions and the second display portion also includes N types of display regions is used for describing the display panel provided in the embodiment of the present disclosure below.

Figure 11:
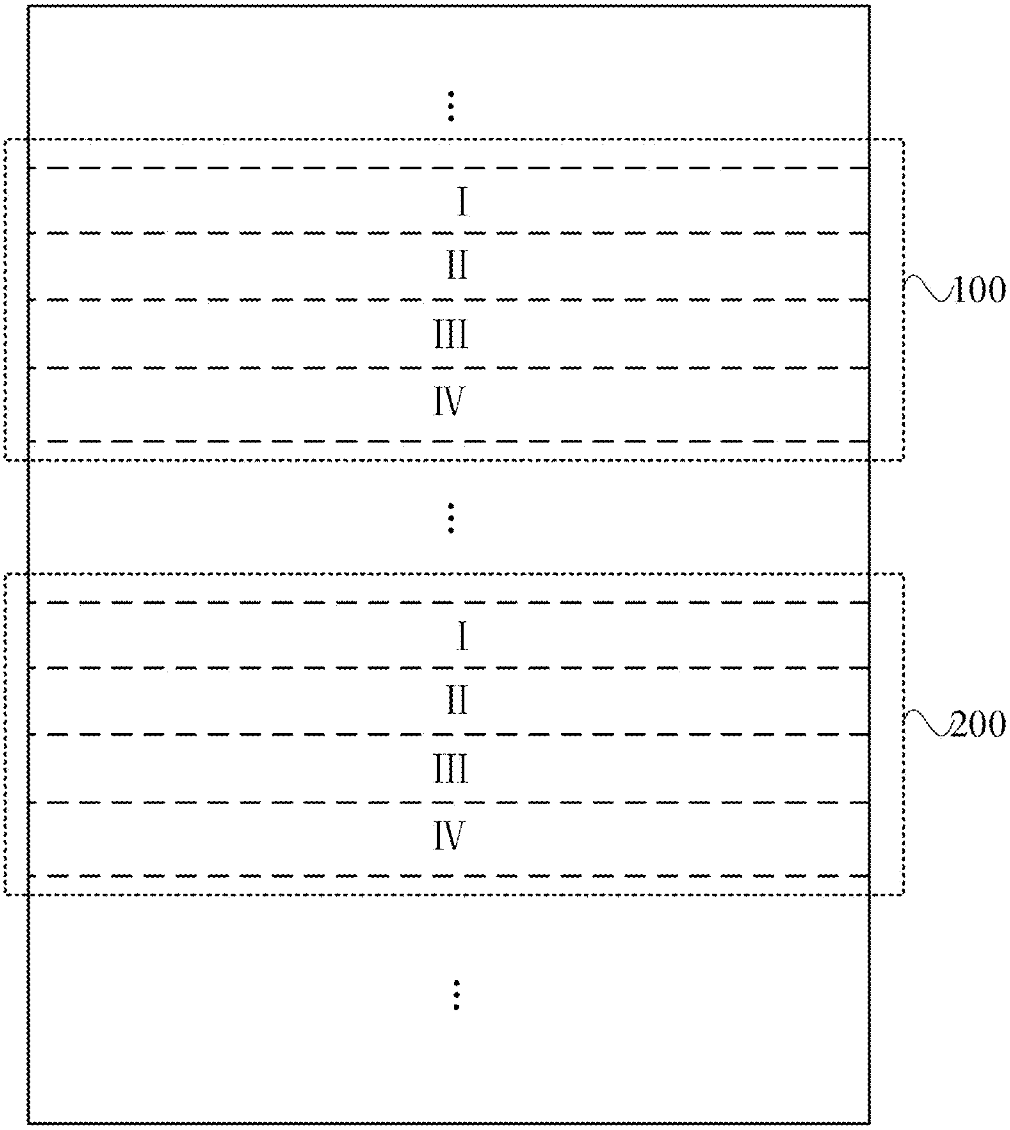
FIG. 11 is a structural diagram of another display panel according to an embodiment of the present disclosure.

In an example, in an embodiment of the present disclosure, the arrangement sequence of various types of display regions in the first display portion along the second direction is the same as the arrangement sequence of various types of display regions in the second display portion along the second direction. FIG. 11 is a structural diagram of another display panel according to an embodiment of the present disclosure. Referring to FIG. 11, an example where N=4 is illustrated. The first display portion 100 includes first type display region I, second type display region II, third type display region III and fourth type display region IV, and various types of display regions in the first display portion 100 are arranged in the sequence of I, II, III and IV. The second display portion 200 also includes first type display region I, second type display region II, third type display region III and fourth type display region IV, and various types of display regions in the second display portion 200 are also arranged in the sequence of I, II, III and IV.

Figure 12:
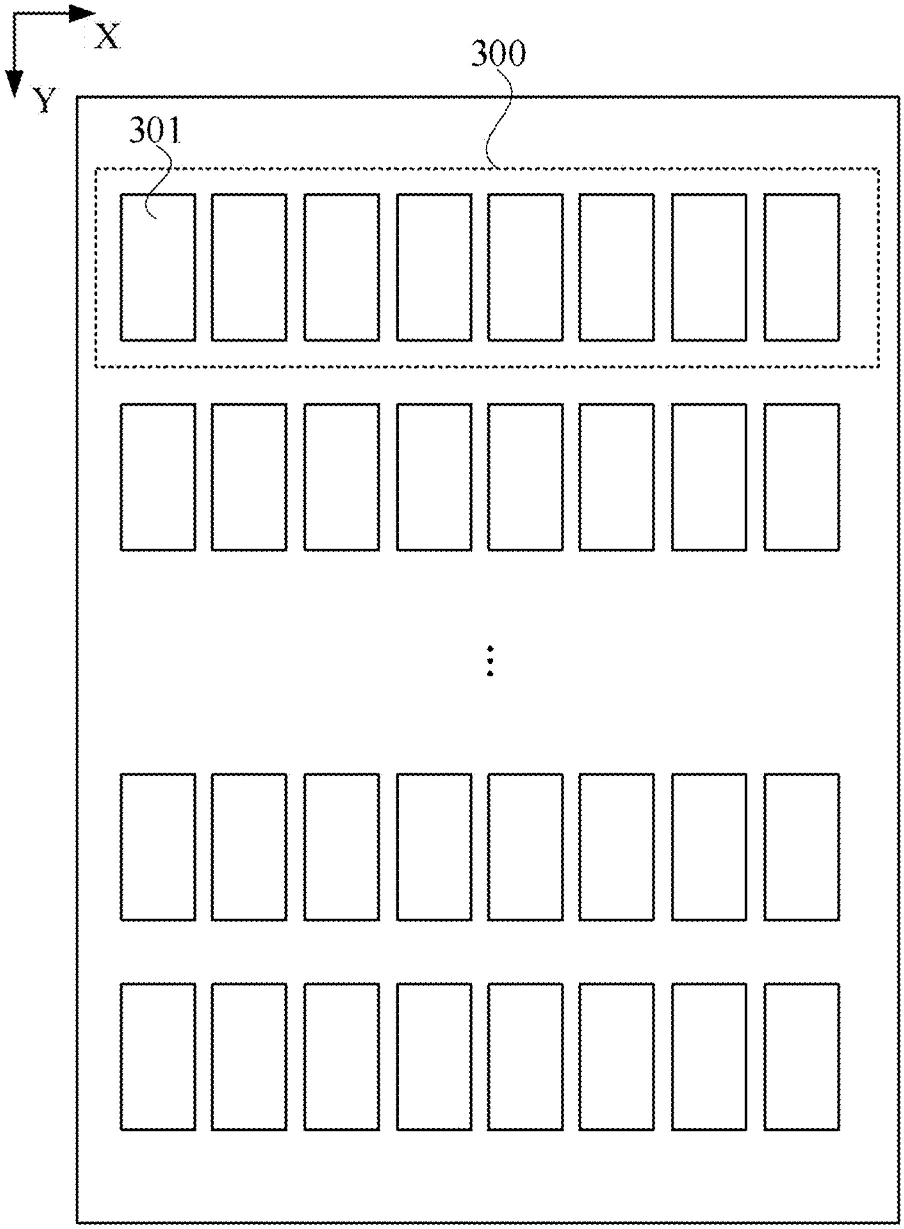
FIG. 12 is a structural diagram of another display panel according to an embodiment of the present disclosure.

FIG. 12 is a structural diagram of another display panel according to an embodiment of the present disclosure. Referring to FIG. 12, in an exemplary embodiment, the display panel includes multiple pixel rows 300 which are arranged along the second direction Y, where light-emitting elements 301 in a pixel row 300 are arranged along the first direction X. Each type of display regions of the N types of display regions includes one pixel row 300.

In the embodiment, sweep signal lines (not shown in FIG. 12) extend along the first direction X, that is, along a row direction. Therefore, it is set that each type of display region includes one pixel row 300, so that it may be designed according to requirements that light-emitting elements in each display portion in the display panel are lighted row by row. Compared with the related art where all light-emitting elements emit light simultaneously, the number of light-emitting elements which emit light simultaneously can be greatly reduced, so that voltage drops on the power supply voltage line are reduced, and the display uniformity is improved.

Figure 13:
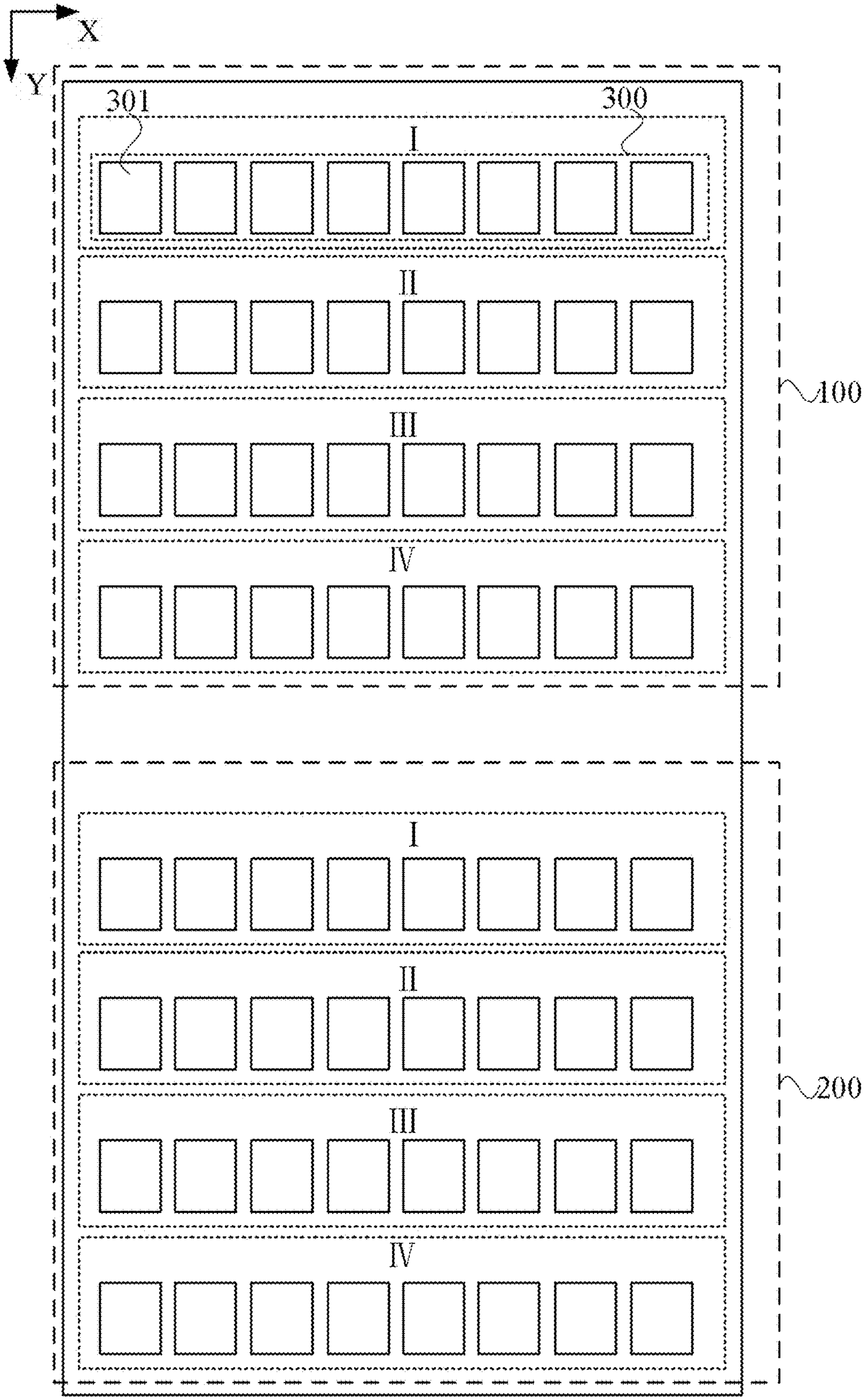
FIG. 13 is a structural diagram of another display panel according to an embodiment of the present disclosure.

FIG. 13 is a structural diagram of another display panel according to an embodiment of the present disclosure. In an exemplary embodiment, in an embodiment of the present disclosure, each type of display region of the N types of display regions includes a pixel row 300 so that the uniformity of the display image of the display panel is further improved. The example where N=4 is further illustrated. Referring to FIG. 13, the first display portion 100 and the second display portion 200 each includes four types of display regions, that is, first type display region I, second type display region II, third type display region III and fourth type display region IV, and each type of display region includes a pixel row 300.

In an exemplary embodiment, a light emission color of light-emitting elements in the i-th type of display region is different from a light emission color of light-emitting elements in the j-th type of display region. When the i-th type of display region and the j-th type of display region are adjacent pixel rows, it may be set that light-emitting elements in the same display region have the same light emission color, and light-emitting elements in different display regions have different light emission colors, so that color display is achieved. In other embodiments, it may also be set that the same display regions include light-emitting elements having different light emission colors, and the specific implementation may be designed according to actual situations.

In another embodiment, in an exemplary embodiment, the display panel includes multiple pixel rows which are arranged along the second direction, and light-emitting elements in a pixel row are arranged along the first direction. Each type of display region of the N types of display regions includes at least two pixel rows.

Figure 14:
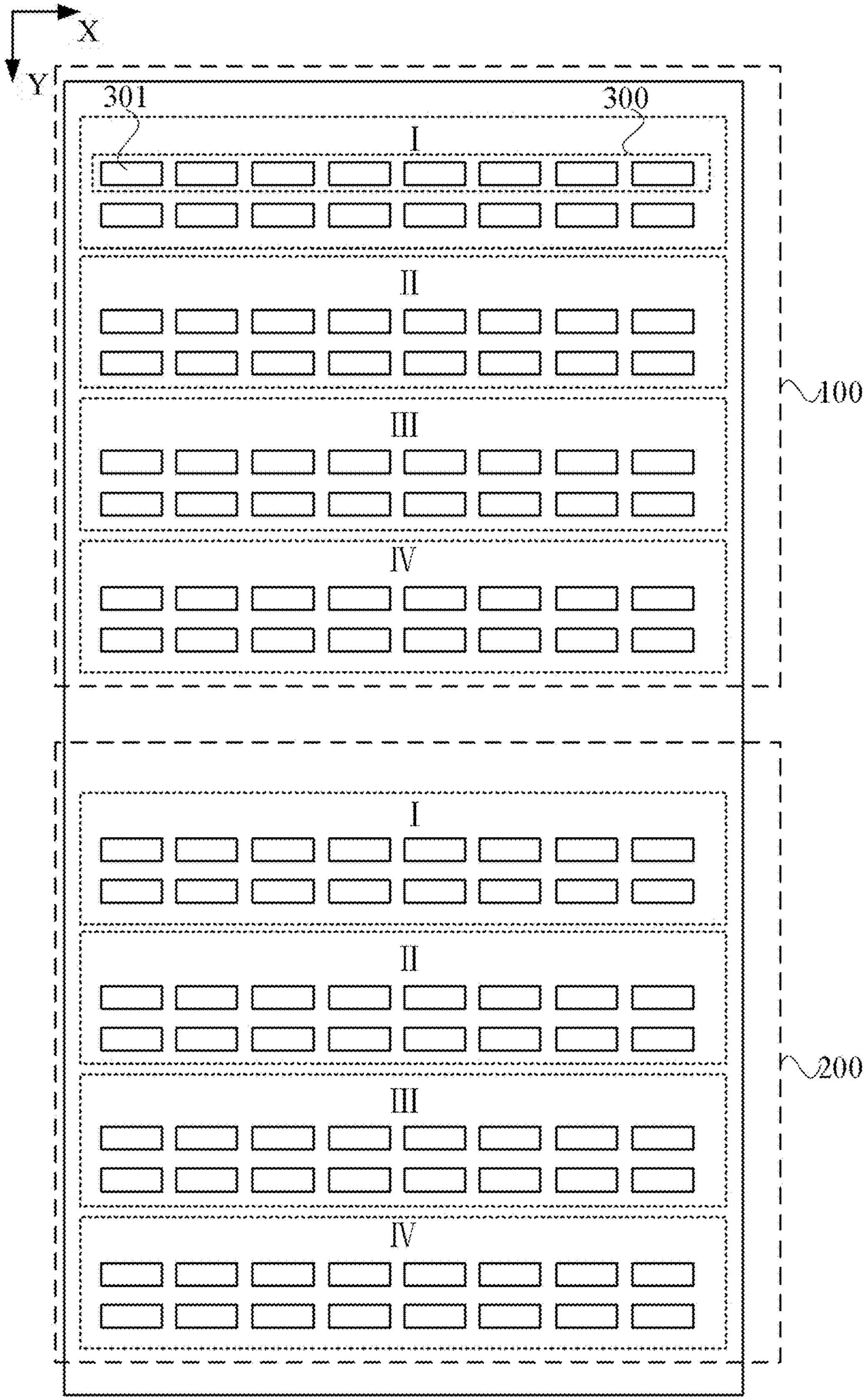
FIG. 14 is a structural diagram of another display panel according to an embodiment of the present disclosure.

Exemplarily, an example where each type of display region includes two pixel rows is illustrated. FIG. 14 is a structural diagram of another display panel according to an embodiment of the present disclosure. Referring to FIG. 14, each type of display region includes two pixel rows 300. In other embodiments, each type of display region may include other number of pixel rows, each display portion may include other numbers of display regions, and types and the arrangement sequence of display regions included in the first display portion and types and the arrangement sequence of display regions included in the second display portion may be the same or different, which are not limited in the embodiment of the present disclosure.

Figure 15:
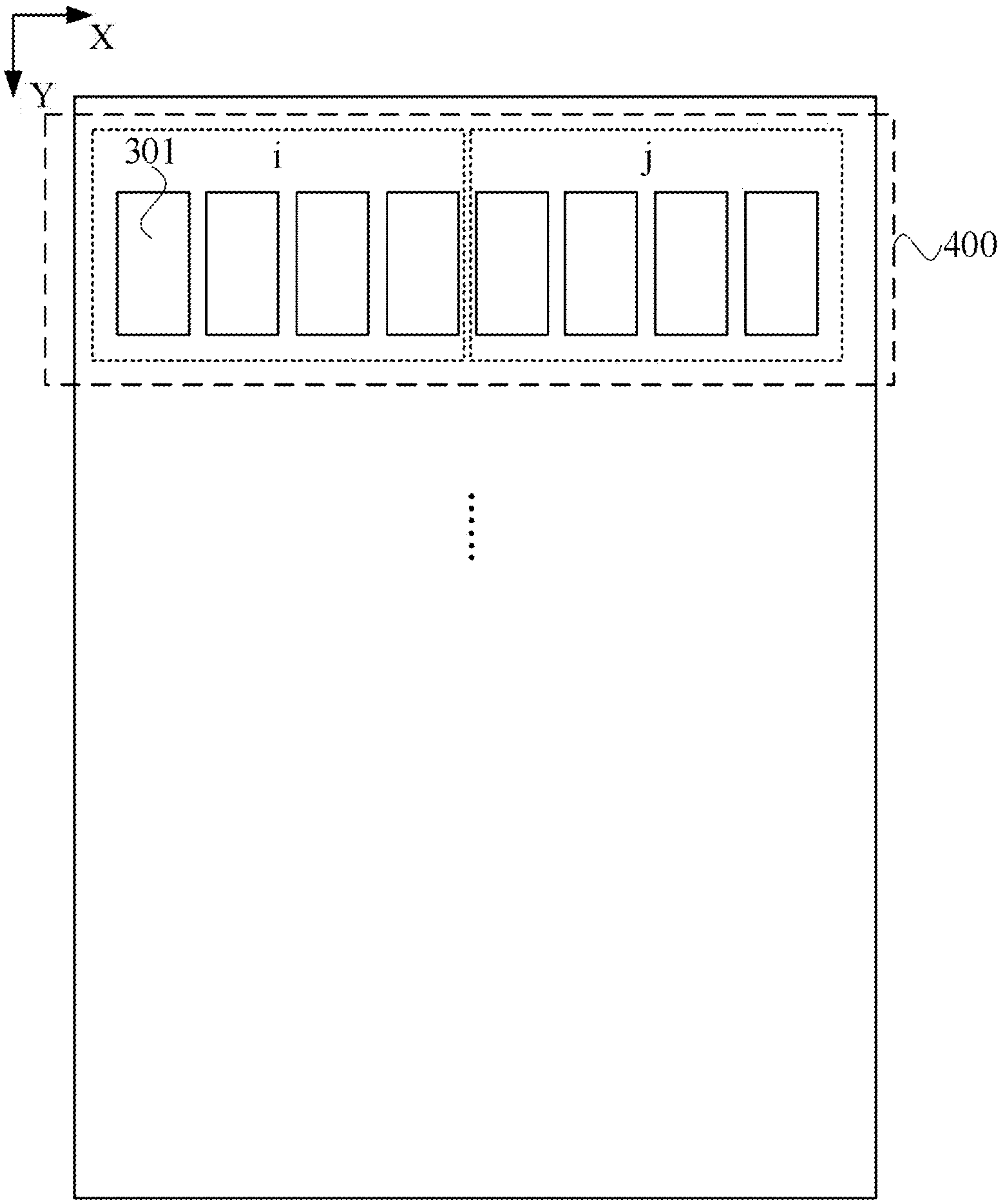
FIG. 15 is a structural diagram of another display panel according to an embodiment of the present disclosure.

FIG. 15 is a structural diagram of another display panel according to an embodiment of the present disclosure. Referring to FIG. 15, in an exemplary embodiment, the display panel includes a third display portion 400, the third display portion 400 includes at least one i-th type of display region and at least one j-th type of display region, and the at least one i-th type of display region and the at least one j-th type of display region in the third display portion 400 are arranged along the first direction X. That is, in the embodiment of the present disclosure, for multiple light-emitting elements which are arranged along the first direction X (the row direction), some light-emitting elements are located in the i-th type of display region, and the other light-emitting elements are located in the j-th type of display region, so that the number of light-emitting elements driven by scan lines during the same time period is reduced, and thus the load on the scan lines is reduced.

It is to be noted that in any of the preceding embodiments, light-emitting elements in the N types of display regions may be driven by the same gate driver circuit or different gate driver circuits, which is not limited in the embodiment of the present disclosure.

Figure 16:
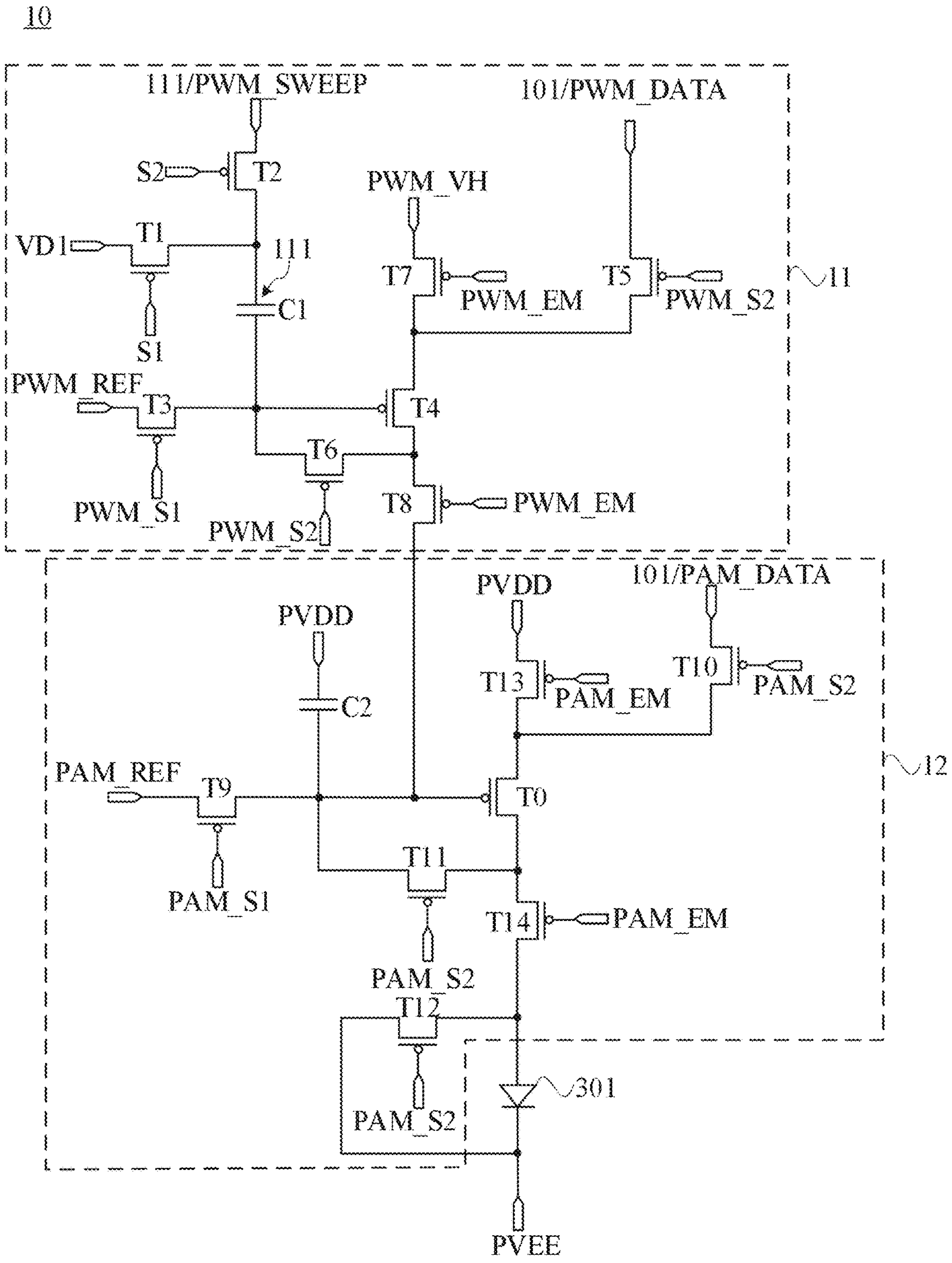
FIG. 16 is a structural diagram of a pixel driving circuit according to an embodiment of the present disclosure.

FIG. 16 is a structural diagram of a pixel driving circuit according to an embodiment of the present disclosure. Referring to FIG. 16, In an exemplary embodiment, the pixel driving circuit 10 includes a first transistor T1 and a second transistor T2, a first terminal of the first transistor T1 is electrically connected to a fixed potential terminal VD1, a control terminal of the first transistor T1 is electrically connected to a first scan terminal S1, a second terminal of the first transistor T1 is electrically connected to the sweep signal terminal 111, a first terminal of the second transistor T2 is electrically connected to the data signal terminal 101, a second terminal of the second transistor T2 is electrically connected to the sweep signal terminal 111, and a control terminal of the second transistor T2 is electrically connected to a second scan terminal S2. A scan signal of the first scan terminal S1 and a scan signal of the second scan terminal S2 are inverse signals.

The first transistor T1 and the second transistor T2 are configured to alternately provide a signal of the fixed potential terminal VD1 and a signal provided by a data signal line for the sweep signal terminal 111, so that a potential of the sweep signal terminal 111 is not in a floating state. If the potential of the sweep signal terminal 111 is in the floating state, the potential of the sweep signal terminal 111 is easily affected by adjacent circuits and then changes, thereby affecting the potential of other positions in the pixel driving circuit.

The first transistor T1 and the second transistor T2 may be the same type of transistors, such as P-type transistors shown in FIG. 16, or N-type transistors. The first transistor T1 and the second transistor T2 are controlled by inverse scan signals respectively, so that when one of the first transistor T1 and the second transistor T2 is controlled to be in a turned-on state, the other of the first transistor T1 and the second transistor T2 is controlled in a turned-off state. Therefore, seamless switching between the turned-on state of the first transistor T1 and the turned-on state of the second transistor T2 is achieved, and the floating state of the potential of the sweep signal terminal 111 is avoided.

Figure 17:
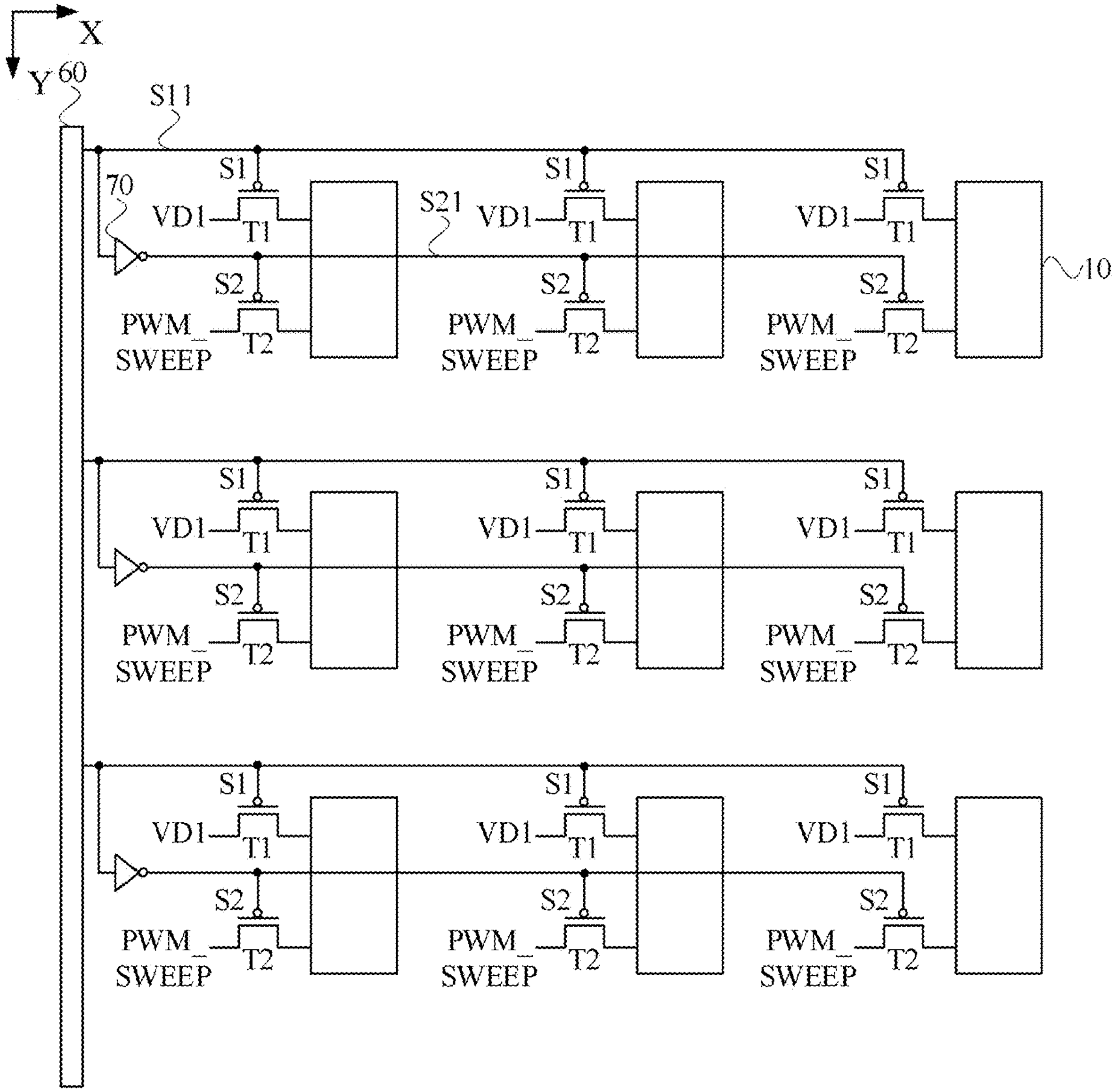
FIG. 17 is a structural diagram of a circuit of a display panel according to an embodiment of the present disclosure.

Exemplarily, FIG. 17 is a structural diagram of a circuit of a display panel according to an embodiment of the present disclosure. Referring to FIG. 17, the first transistor T1 and the second transistor T2 are the same type of transistors (P-type transistors are shown as an example in FIG. 17, which is not a limitation on the embodiment of the present disclosure). A control signal of the first transistor T1 is provided by a first scan line S11, a control signal of the second transistor T2 is provided by a second scan line S21, and a scan signal of the first scan line 11 and a scan signal of the second scan line S21 are generated by the same signal source 60. The scan signal of the first scan line S11 is directly output by the signal source 60, and an inverter 70 is disposed between the second scan line S21 and the signal source 60.

It is to be noted that in the embodiment, the signal source 60 only outputs one scan signal, and thus the inverter 70 is further disposed. In another embodiment, a signal source 60 which directly outputs two inverse signals may be disposed. The specific implementation may be selected according to actual situations.

In another embodiment, the first transistor T1 and the second transistor T2 may be different types of transistors. It may be set that one of the first transistor T1 and the second transistor T2 is a P-type transistor and the other of the first transistor T1 and the second transistor T2 is an N-type transistor. At this time, the first scan terminal S1 and the second scan terminal S2 may be the same scan terminal. When the same scan signal is provided for a gate of the first transistor T1 and a gate of the second transistor T2, due to the different transistor types of the first transistor T1 and the second transistor T2, one of the first transistor T1 and the second transistor T2 is in the turned-on state and the other of the first transistor T1 and the second transistor T2 is in the turned-off state, which is conducive to the first transistor T1 and the second transistor T2 providing different signals for the sweep signal terminal 111 respectively.

Figure 18:
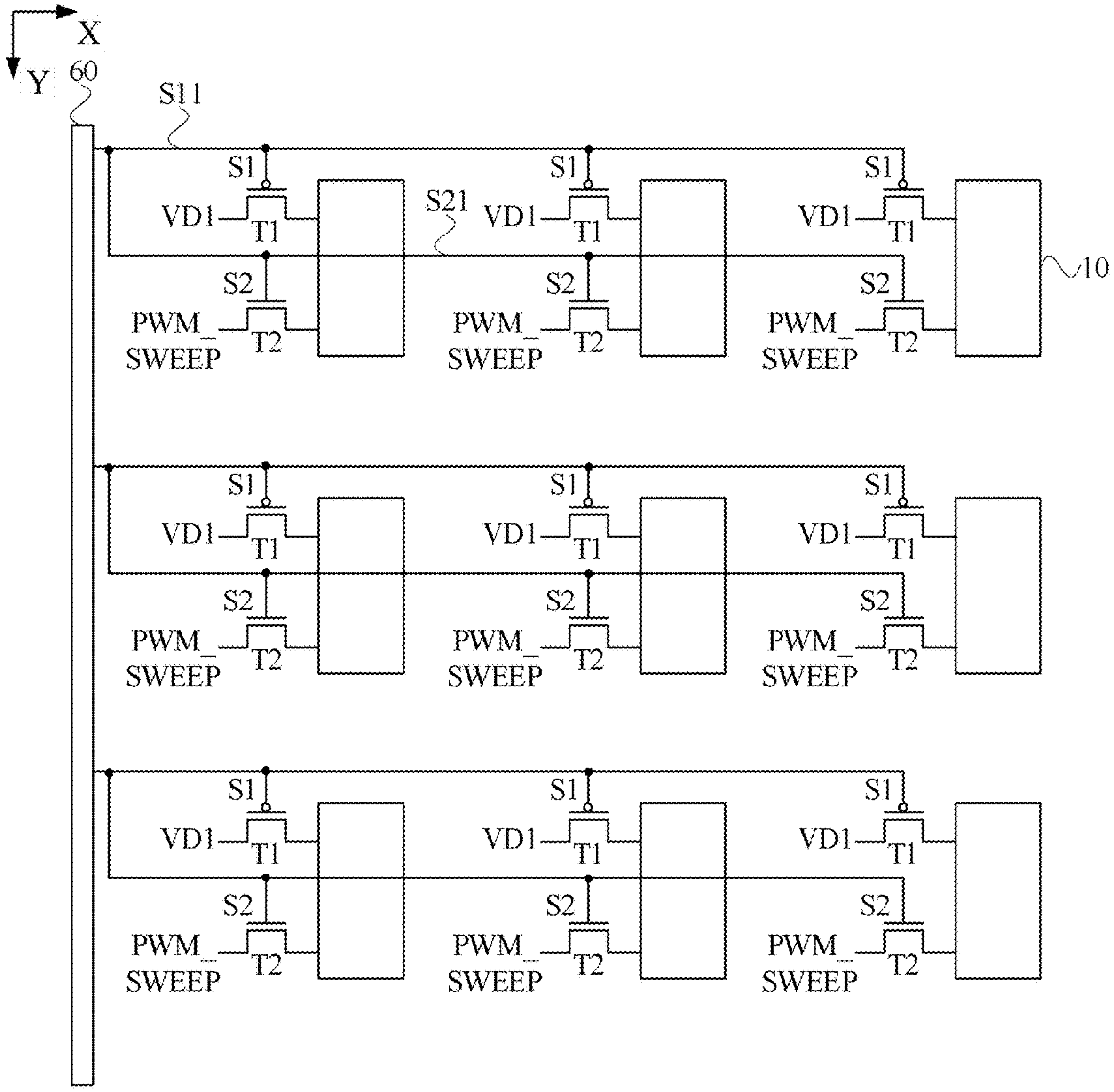
FIG. 18 is a structural diagram of a circuit of another display panel according to an embodiment of the present disclosure.

Exemplarily, FIG. 18 is a structural diagram of a circuit of another display panel according to an embodiment of the present disclosure. Referring to FIG. 18, the first transistor T1 and the second transistor T2 are different types of transistors (T1 being a P-type transistor and T2 being an N-type transistor are shown as an example in FIG. 18, which is not a limitation in the embodiment of the present disclosure). The control signal of the first transistor T1 is provided by the first scan line S11, and the control signal of the second transistor T2 is provided by the second scan line S21. The first scan line S11 and the second scan line S21 are connected to the same output terminal of the signal source 60.

The first transistor T1 and the second transistor T2 are set, so that the data signal line is reused, that is, the data signal line may provide a data signal for the data signal terminal 101 and provide a sweep signal for the sweep signal terminal 111. In an exemplary embodiment, an operation of the pixel driving circuit 10 includes a data writing stage and a light emission stage. In the data writing stage, the data signal line provides a data signal for the data signal terminal 101; in the light emission stage, the data signal line provides a sweep signal to the sweep signal terminal 111.

In an example, in the data writing stage, the first scan terminal S1 controls the first transistor T1 to be turned on, and the fixed potential terminal VD1 provides a fixed potential to the sweep signal terminal 111. The fixed potential terminal VD1 may be a grounding voltage GND, or the fixed potential terminal VD1 may be a power supply voltage VDD that drives light-emitting elements to emit light, or the voltage value of the fixed potential terminal VD1 may be the same as the constant voltage value provided by the data signal line, which is not limited in the embodiment of the present disclosure. The second scan terminal S2 controls the second transistor T2 to be turned off, and the data signal provided by the data signal line is loaded on the data signal terminal 101. Since the second transistor T2 is in the turned-off state at this time, the data signal will not be loaded on the sweep signal terminal 111. In the light emission stage, the first scan terminal S1 controls the first transistor T1 to be turned off, and the second scan terminal S2 controls the second transistor T2 to be turned on. The sweep signal provided by the data signal line is loaded on the sweep signal terminal 111. Since the transistor (T5 in FIG. 16) for data signal writing during the light emission stage has already been turned off, no data signal will be written, so that the data signal line is reused. It is to be noted that the data signal terminal 101 shown in FIG. 16 connected to the sweep signal terminal 111 being the data signal terminal in the pulse width modulation module 11 is merely for illustrating the reuse of the data signal line in the embodiment of the present disclosure and is not a limitation in the embodiment of the present disclosure.

In the specific implementation, in an exemplary embodiment, light-emitting elements in the same type of display regions of the N types of display regions share the sweep signal. For example, one type of display region may include a row of light-emitting elements which are connected to one sweep signal line, and these light-emitting elements share a sweep signal due to the connection with the same data signal line.

In an exemplary embodiment, with continued reference to FIG. 16, the pixel driving circuit 10 further includes an amplitude modulation module 12. The pulse width modulation module 11 outputs a pulse width setting signal based on the sweep signal to the amplitude modulation module 12 to control the light emission duration of the light-emitting element 301, and the amplitude modulation module 12 is configured to control an intensity of a drive current of the light-emitting element 301.

The amplitude modulation module 12 determines the duration of applying the drive current to the light-emitting element 301 based on the pulse width setting signal to control the duty cycle of the light emission time period to the entire light emission stage. The amplitude modulation module 12 may specifically be a 7T1C circuit including seven transistors and one capacitor, and is also configured to control the magnitude of the drive current to adjust the brightness of the emitted light. It is to be understood that when the same type of display region includes a row of light-emitting elements, all light-emitting elements may be connected to the data signal line through one sweep signal line. When the same type of display region include multiple rows of light-emitting elements, multiple sweep signal lines corresponding to the multiple rows of light-emitting elements may be connected to the same data signal line.

Figure 19:
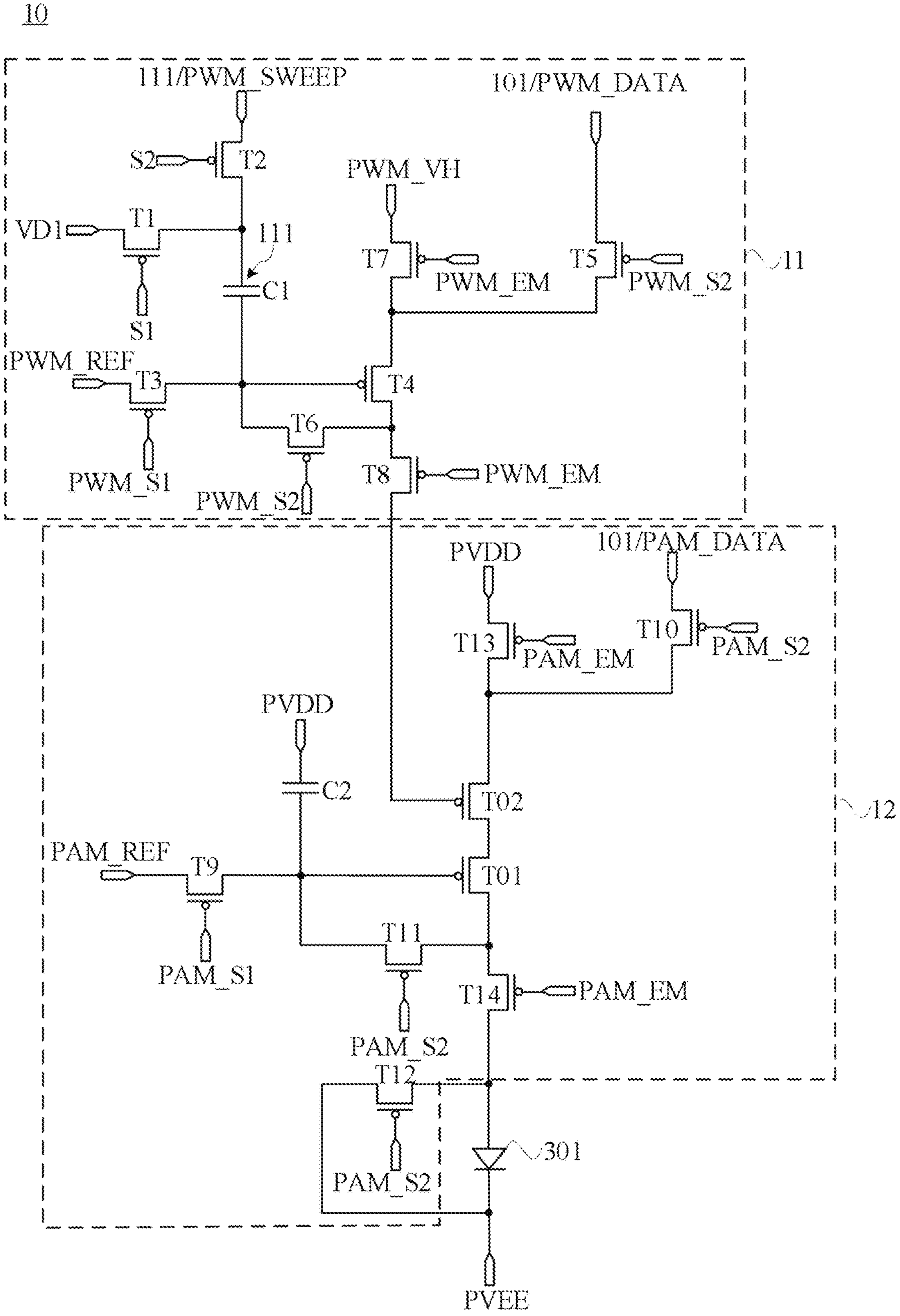
FIG. 19 is a structural diagram of another pixel driving circuit according to an embodiment of the present disclosure.

FIG. 19 is a structural diagram of another pixel driving circuit according to an embodiment of the present disclosure. Referring to FIG. 19, in an exemplary embodiment, the amplitude modulation module 12 includes a drive transistor T01 and a pulse width modulation transistor T02, a pulse width setting signal output by the pulse width modulation module 11 is output to a control terminal of the pulse width modulation transistor T02, and the drive transistor T01 is configured to control the intensity of the drive current of the light-emitting element 301 according to an amplitude data signal It is to be understood that the amplitude modulation module 12 may include a 7T1C circuit similar to FIG. 16, where the drive transistor T01 is the drive transistor in the 7T1C circuit. Different from FIG. 16, the pulse width modulation transistor T02 in series connection with the drive transistor T01 is further disposed in FIG. 19. When the drive transistor T01 and the pulse width modulation transistor T02 are turned on simultaneously, the light-emitting element emits light. The pulse width modulation transistor T02 being located above the drive transistor T01 shown in FIG. 19 is merely illustrative and is not a limitation on the embodiment of the present disclosure. In other embodiments, the pulse width modulation transistor may also be connected below the drive transistor T01 (that is, between T01 and T14), and the specific implementation may be designed according to actual situations.

In another embodiment, the pulse width setting signal may be directly loaded on a control terminal of the drive transistor. With continued reference to FIG. 16, in an exemplary embodiment, the amplitude modulation module 12 includes a drive transistor T0, and the drive transistor T0 is configured to control the intensity of the drive current of the light-emitting element 301 according to an amplitude data signal. The pulse width setting signal output by the pulse width modulation module 11 is output to a control terminal of the drive transistor T0. The drive transistor T0 controls the light-emitting element 301 to emit light under control of the pulse width setting signal and the amplitude data signal.

Figure 20:
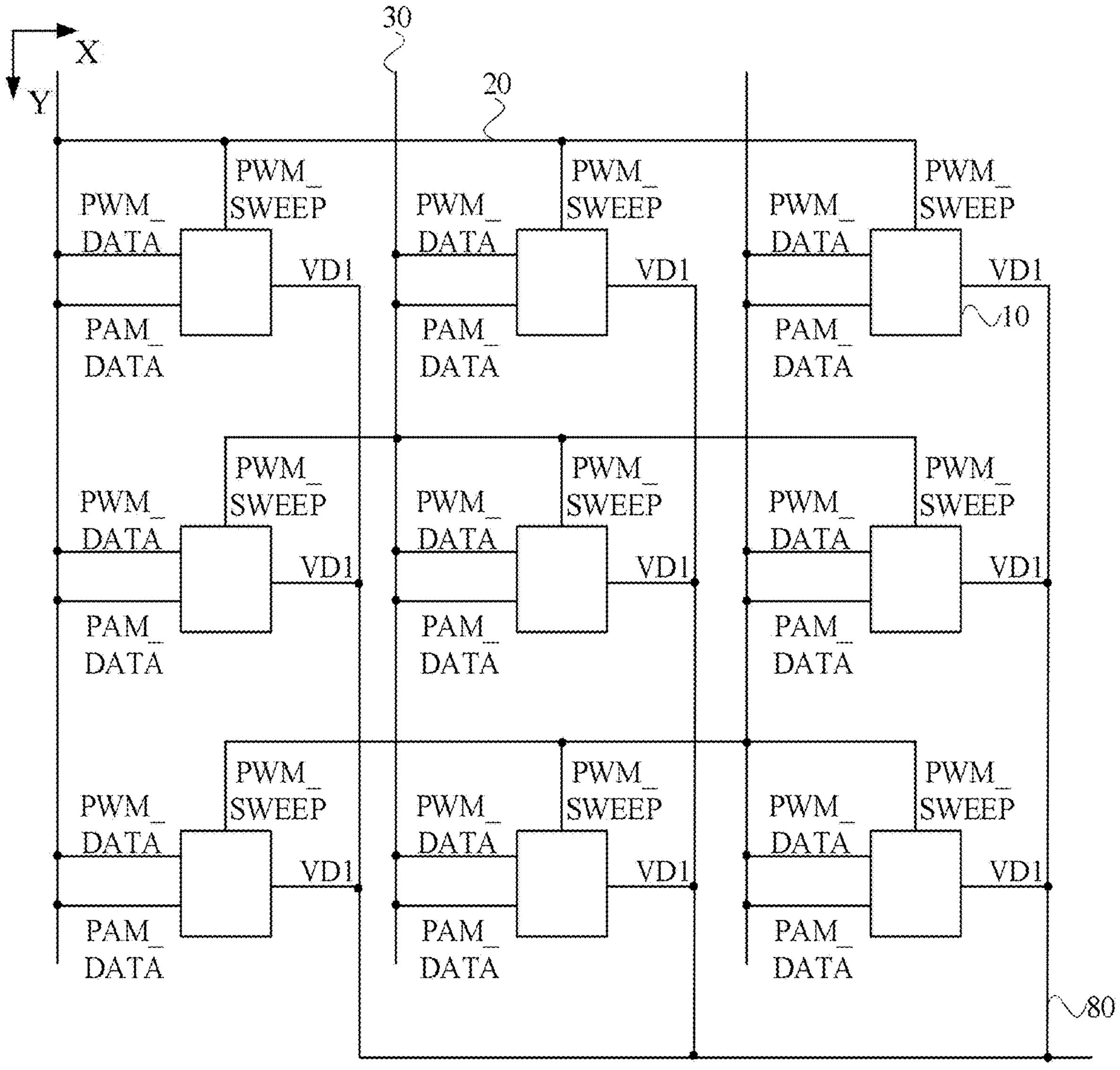
FIG. 20 is a structural diagram of a circuit of another display panel according to an embodiment of the present disclosure.

An example where the pulse width setting signal is loaded on the control terminal of the drive transistor is illustrated. Referring to FIG. 16, the pulse width modulation module 11 includes eight transistors T1 to T8 and a capacitor C1, and the amplitude modulation module 12 includes seven transistors T0 and T9 to T14 and a capacitor C2. In an exemplary embodiment, an operation of the pixel driving circuit 10 includes a data writing stage and a light emission stage. The data signal terminal 101 includes an amplitude data signal terminal PAM_DATA which is located in the amplitude modulation module 12 and a pulse width data signal terminal PWM_DATA which is located in the pulse width modulation module 11. FIG. 20 is a structural diagram of a circuit of another display panel according to an embodiment of the present disclosure. Referring to FIG. 20, the amplitude data signal terminal PAM_DATA and the pulse width data signal terminal PWM_DATA in the same pixel driving circuit 10 are connected to the same data signal line 30. The data writing stage includes an amplitude data writing stage and a pulse width data writing stage. In the amplitude data writing stage, the data signal line 30 provides an amplitude data signal for the amplitude data signal terminal PAM_DATA, in the pulse width data writing stage, the data signal line 30 provides a pulse width data signal for the pulse width data signal terminal PWM_DATA, and the second scan terminal S2 controls the second transistor T2 to be turned off at this time. In the light emission stage, the second scan terminal S2 controls the second transistor T2 to be turned on, and the data signal line 30 provides a sweep signal for the sweep signal terminal 111.

In an exemplary embodiment, the amplitude data writing stage and the pulse width data writing stage are sequentially performed.

Figure 21:
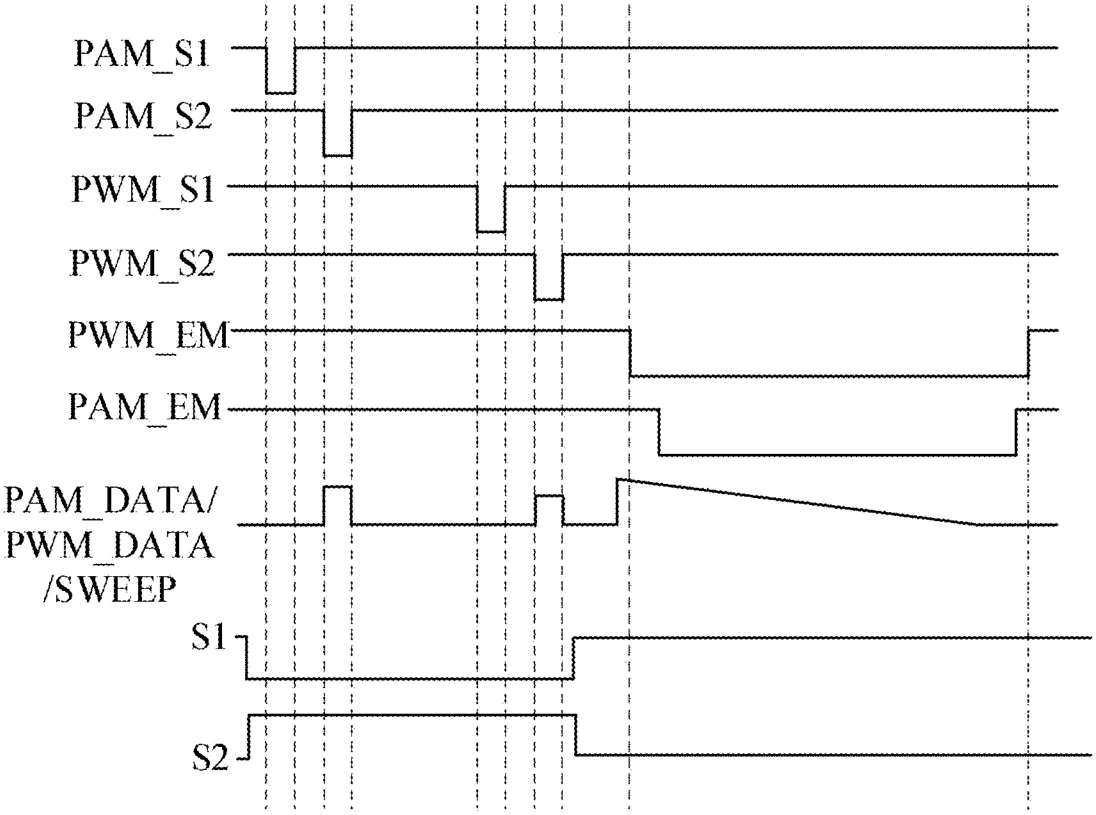
FIG. 21 is a working timing diagram of a pixel driving circuit according to an embodiment of the present disclosure.

Exemplarily, FIG. 21 is a working timing diagram of a pixel driving circuit according to an embodiment of the present disclosure. Referring to FIG. 21, a first scan terminal PAM_S1 of the amplitude modulation module 12 controls the transistor T9 to be turned on, a reference signal PAM_REF initializes a gate of the drive transistor T0, and PAM_REF, as a low-level signal, may turn on the drive transistor T0; then, a second scan terminal PAM_S2 of the amplitude modulation module 12 controls a first control transistor T10 and the transistor T11 to be turned on, threshold compensation for the drive transistor T0 is achieved while the amplitude data signal is written, and at the same time, the transistor T12 is turned on to reset a first electrode of the light-emitting element 301; next, a first scan terminal PWM_S1 of the pulse width modulation module 11 controls the transistor T3 to be turned on, and a reference signal PWM_REF initializes a gate of the transistor T4, the process of which is similar to the initialization process of the drive transistor T0; then, a second scan terminal PWM_S2 of the pulse width modulation module 11 controls a second control transistor T5 and the transistor T6 to be turned on, and threshold compensation for the transistor T4 is achieved while the pulse width data signal is written. In the entire data writing stage, the first scan terminal S1 always controls the first transistor T1 to be turned on, and the second scan terminal S2 controls the second transistor T2 to be turned off. In the light emission stage, a light emission control signal PWM_EM of the pulse width modulation module 11 controls the transistor T7 and the transistor T8 to be turned on, the second transistor S2 controls the second transistor to be turned on, the sweep signal provided by the data signal line is loaded on the sweep signal terminal 111 (that is, PWM_SWEEP, which is one terminal of the capacitor C1) and thus a voltage of the gate of the transistor T4 is changed according to the bootstrap effect of the capacitor, and when a voltage of the sweep signal reaches a threshold, the pulse width modulation module 11 outputs a turning-off signal to the gate of the drive transistor T0 to control the drive transistor T0 to be turned off; a light emission control signal PAM_EM of the amplitude modulation module 12 controls the transistor T13 and the transistor T14 to be turned on and controls the light-emitting element 301 to emit light when the drive transistor T0 is turned on. A start moment of an enable signal of the second scan terminal S2 is earlier than a start moment of the light emission control signal PWM_EM. That is, before the light emission stage, the second transistor T2 is controlled to be turned on, which is conducive to improving the stability of the circuit. In addition, the power supply voltage of the pulse width modulation module 11 is PWM_VH. The voltage of a second electrode of the light-emitting element 301 is PVEE.

It is to be noted that transistors being P-type transistors is used as an example for describing the embodiment, which is not a limitation on the embodiment of the present disclosure.

Figure 22:
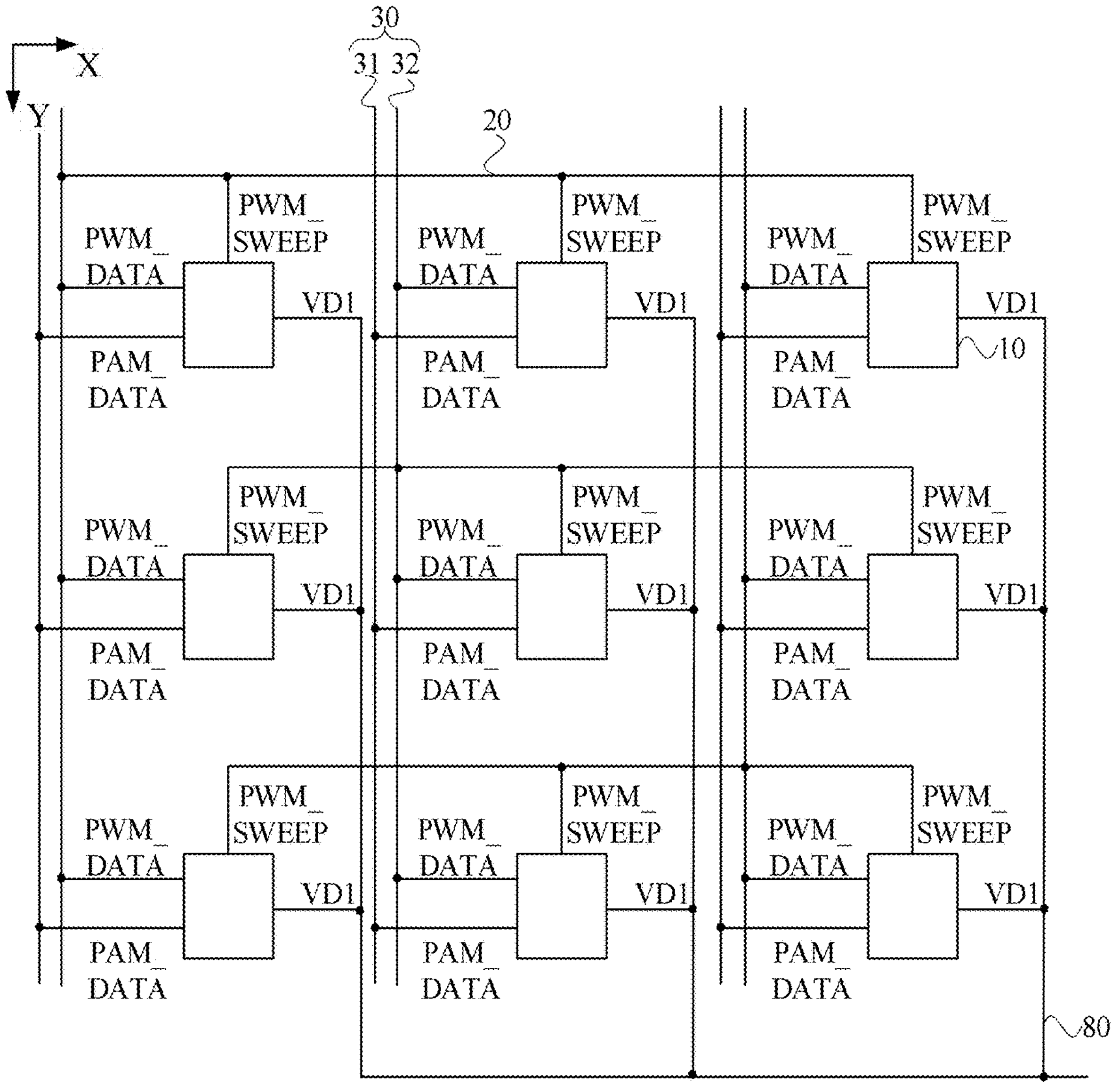
FIG. 22 is a structural diagram of a circuit of another display panel according to an embodiment of the present disclosure.

In the preceding embodiments, the amplitude data signal terminal PAM_DATA and the pulse width data signal terminal PWM_DATA are connected to the same data signal line as the sweep signal terminal PWM_SWEEP, so that the writing of the amplitude data signal and the writing of the pulse width data signal are performed sequentially. In another embodiment, the amplitude data signal terminal PAM_DATA and the pulse width data signal terminal PWM_DATA may be connected to different data signal lines, so that synchronous writing of the amplitude data signal and the pulse width data signal can be achieved; and the sweep signal terminal PWM_SWEEP may be connected to the same data signal line as the amplitude data signal terminal PAM_DATA or the pulse width data signal terminal PWM_DATA. An example where the pulse width data signal terminal PWM_DATA and the sweep signal terminal PWM_SWEEP share the same data signal line is illustrated. With continued reference to FIG. 16, in an exemplary embodiment, an operation of the pixel driving circuit 10 includes a data writing stage and a light emission stage. The data signal terminal 101 includes an amplitude data signal terminal PAM_DATA which is located in the amplitude modulation module 12 and a pulse width data signal terminal PWM_DATA which is located in the pulse width modulation module 11. FIG. 22 is a structural diagram of a circuit of another display panel according to an embodiment of the present disclosure. Referring to FIG. 22, a data signal line 30 includes a first data signal line 31 and a second data signal line 32, the amplitude data signal terminal PAM_DATA is electrically connected to the first data signal line 31, the pulse width data signal terminal PWM_DATA is electrically connected to the second data signal line 32, and the sweep signal terminal PWM_SWEEP is electrically connected to the first data signal line 31 (the connection with the first data signal line 31 is not shown in FIG. 22) or the second data signal line 32. The data writing stage includes an amplitude data writing stage and a pulse width data writing stage. In the amplitude data writing stage, the first data signal line 31 provides an amplitude data signal for the amplitude data signal terminal PAM_DATA, in the pulse width data writing stage, the second data signal line 32 provides a pulse width data signal for the pulse width data signal terminal PWM_DATA, and the second scan terminal S2 controls the second transistor T2 to be turned off. In the light emission stage, the second scan terminal S2 controls the second transistor T2 to be turned on, and the first data signal line 31 (this implementation is not shown in FIG. 22) or the second data signal line 32 provides a sweep signal for the sweep signal terminal PWM_SWEEP.

It is to be noted that in the embodiment, an example where the second data signal line 32 provides the sweep signals for the sweep signal terminals PWM_SWEEP is illustrated. If it is set that the first data signal line 31 provides the sweep signals for the sweep signal terminals PWM_SWEEP, only the second transistor T2 needs to be adaptively adjusted to be connected between the sweep signal terminal PWM_SWEEP and the amplitude data signal terminal PAM_DATA.

In an exemplary embodiment, the amplitude data writing stage and the pulse width data writing stage are simultaneously performed.

Figure 23:
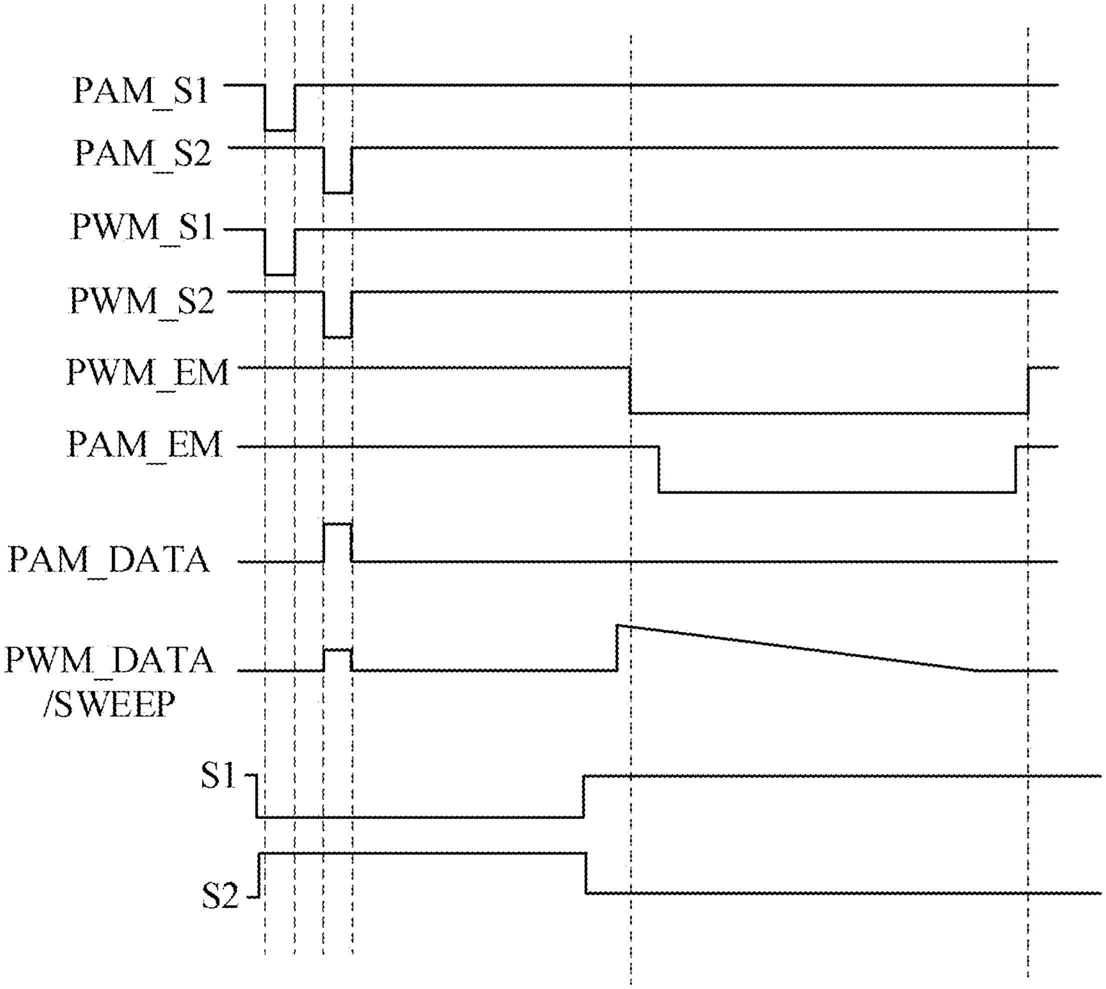
FIG. 23 is a working timing diagram of another pixel driving circuit according to an embodiment of the present disclosure.

In the embodiment, the amplitude data signal and the pulse width data signal are provided by corresponding data signal lines respectively, so that the amplitude data writing stage and the pulse width data writing stage can be simultaneously performed. FIG. 23 is a working timing diagram of another pixel driving circuit according to an embodiment of the present disclosure. Referring to FIG. 23, the working process of the pixel driving circuit is similar to the working process of the pixel driving circuit in FIG. 21 and is not repeated here. The difference is that a scan signal provided by the first scan terminal PAM_S1 of the amplitude modulation module 12 and a scan signal provided by the first scan terminal PWM_S1 of the pulse width modulation module are simultaneously performed, a scan signal provided by the second scan terminal PAM_S2 of the amplitude modulation module 12 and a scan signal provided by the second scan terminal PWM_S2 of the pulse width modulation module are simultaneously performed, and the amplitude data signal and the pulse width data signal are written simultaneously.

With continued reference to FIG. 20 or FIG. 22, first terminals of first transistors (reference is made to T1 in FIG. 16, and the first transistor is not shown in FIG. 20 and FIG. 22) of all pixel driving circuits 10 are all connected to the fixed potential terminal VD1, so that mesh-structured wires 80 may be designed for connecting all fixed potential terminals VD1, and then the wires 80 are connected to a fixed potential to improve the stability of a voltage of the fixed potential terminal VD1.

In an exemplary embodiment, the display panel includes N types of display regions and P display portions, the N types of display regions include a g-th type of display region and an l-th type of display region, where $0<g\le N$, $0<l\le N$, g and l are integers, and $g\ne l$. In the same display frame, a start moment of an effective time period of sweep signals of light-emitting elements in the g-th type of display region is earlier than a start moment of an effective time period of sweep signals of light-emitting elements in the l-th type of display region. The P display portions include a fourth display portion, and the fourth display portion includes at least one g-th type of display region and at least one l-th type display region. The display panel includes a power supply voltage input terminal, and in the fourth display portion, the at least one g-th type of display region is located on a side of the at least one l-th type display region facing away from the power supply voltage input terminal.

Figure 24:
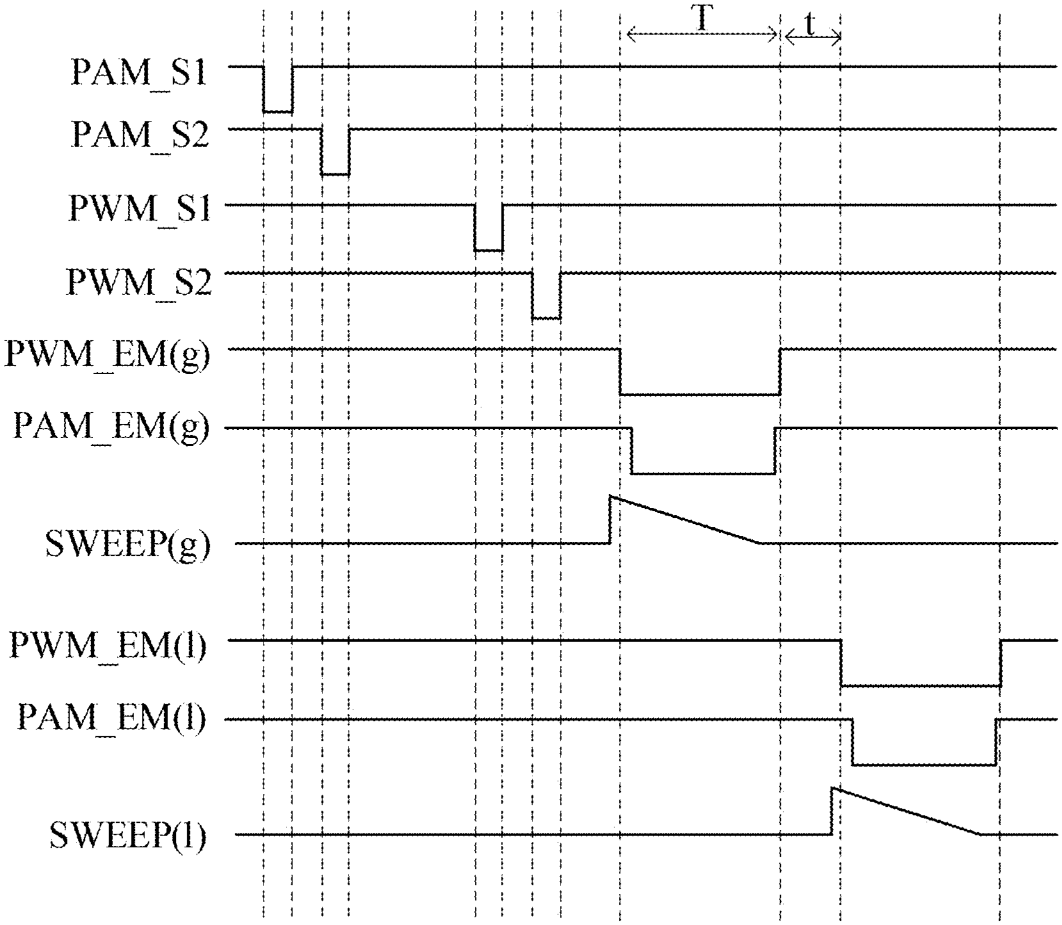
FIG. 24 is a driving timing diagram of a g-th type of display region and an l-th type of display region according to an embodiment of the present disclosure.
Figure 25:
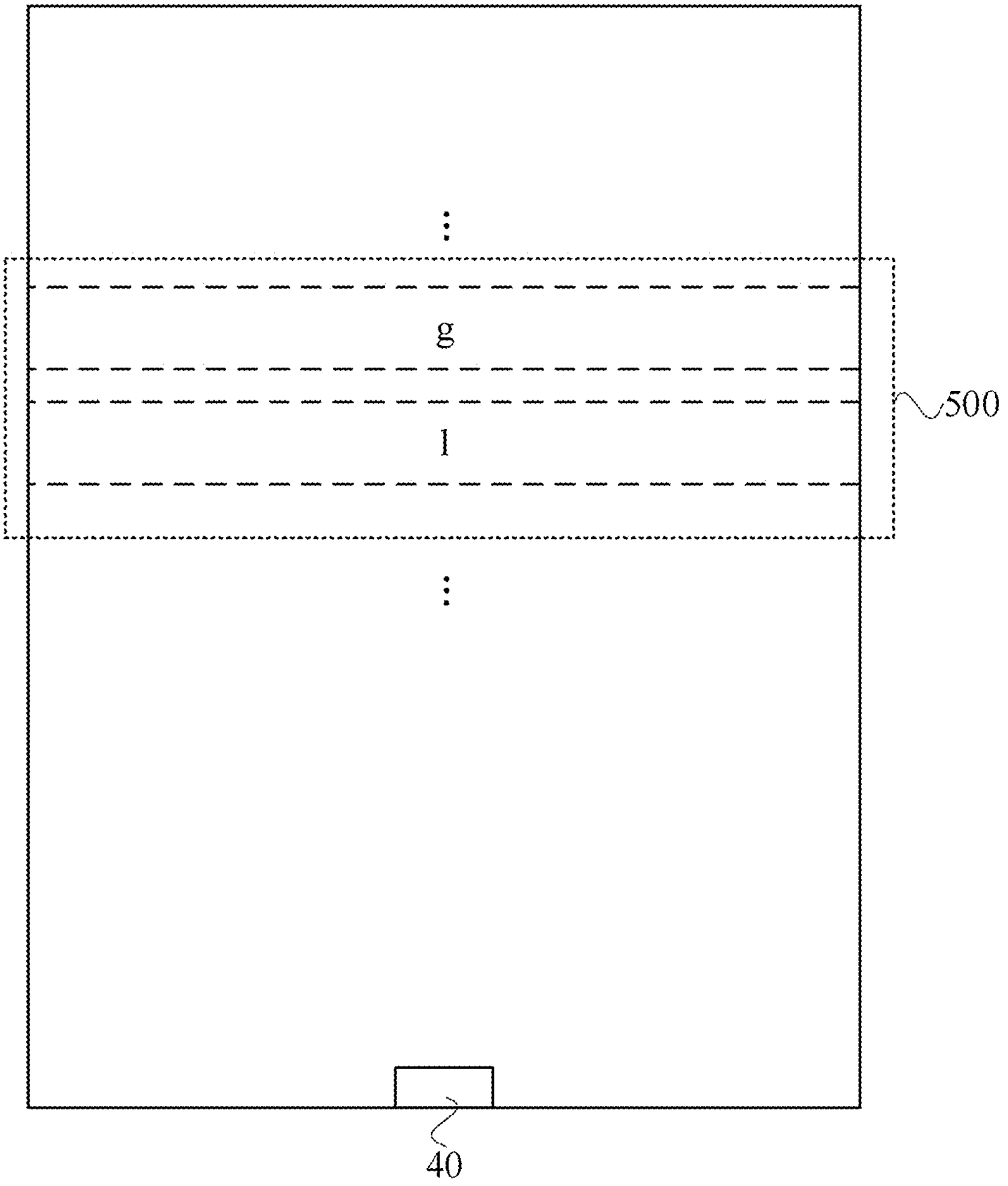
FIG. 25 is a structural diagram of another display panel according to an embodiment of the present disclosure.

Exemplarily, FIG. 24 is a driving timing diagram of a g-th type of display region and an l-th type of display region according to an embodiment of the present disclosure. Referring to FIG. 24, in the same display frame, the start moment of the effective time period of the sweep signals SWEEP of the light-emitting elements in the g-th type of display region is earlier than the start moment of the effective time period of the sweep signals SWEEP of the light-emitting elements in the l-th type display region, that is, a light emission time period of the g-th type of display region is earlier than a light emission time period of the l-th type of display region. SWEEP(g) and SWEEP(l) in FIG. 24 do not show data signals. FIG. 25 is a structural diagram of another display panel according to an embodiment of the present disclosure. Referring to FIG. 25, the P display portions include the fourth display portion 500, and the fourth display portion 500 includes at least one g-th type of display region and at least one l-th type display region. The display panel includes a power supply voltage input terminal 40, and in the fourth display portion 500, the at least one g-th type of display region is located on a side of the at least one l-th type display region facing away from the power supply voltage input terminal 40, so that for the same type of display regions, display regions which are farther from the power supply voltage input terminal 40 emit light first, and display regions which are closer to the power supply voltage input terminal 40 emit light later; therefore, for the same type of display regions, when display regions which are farther away from the power supply voltage input terminal 40 emit light, voltage drops on the power supply voltage line are reduced, and the uniformity of the display image of the display panel is improved.

Figure 26:
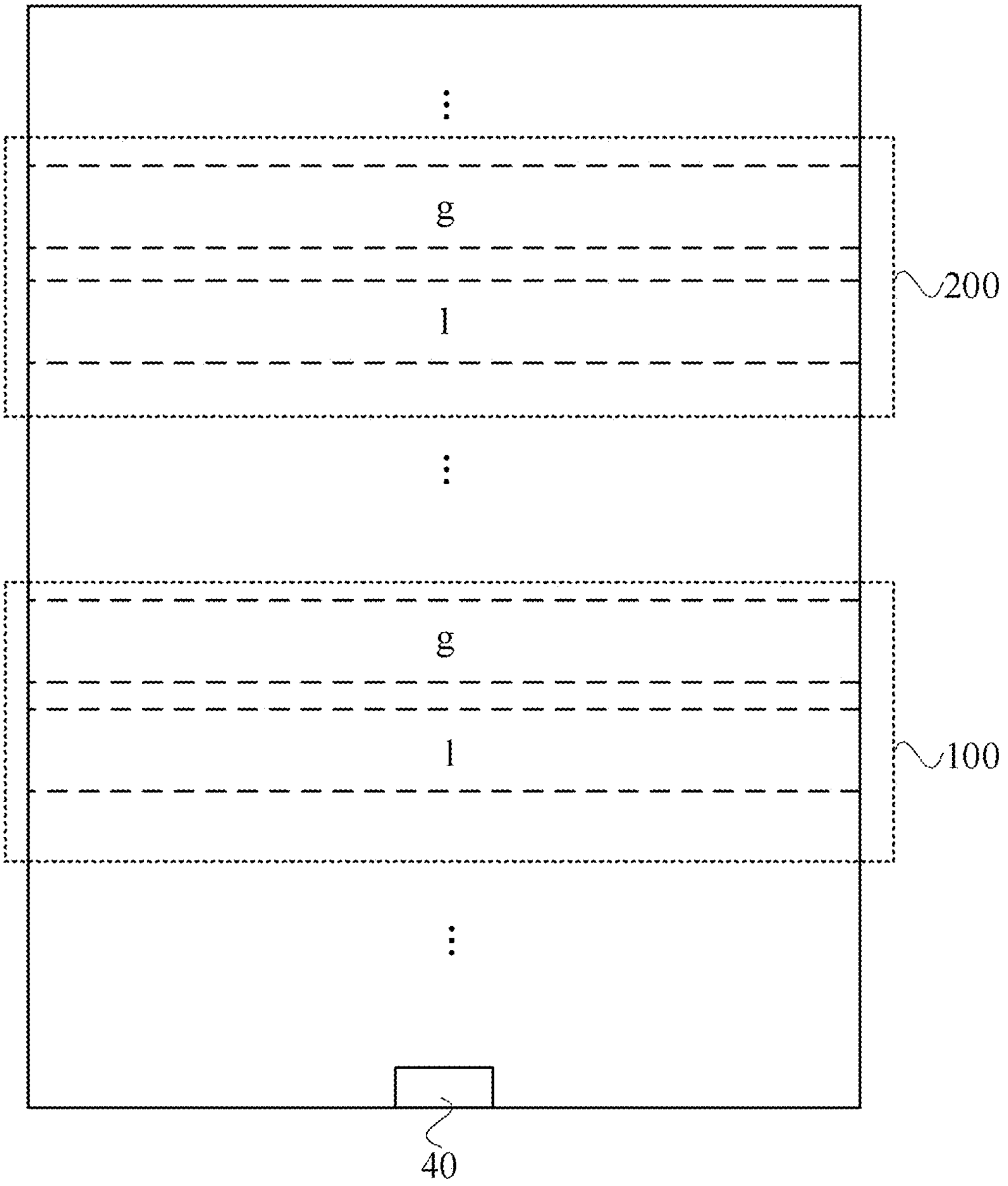
FIG. 26 is a structural diagram of another display panel according to an embodiment of the present disclosure.

FIG. 26 is a structural diagram of another display panel according to an embodiment of the present disclosure. Referring to FIG. 26, in an exemplary embodiment, the display panel includes N types display regions and P display portions, and the P display portions include a first display portion 100 and a second display portion 200. The display panel further includes a power supply voltage input terminal 40, and the first display portion 100 is located on a side of the second display portion 200 facing the power supply voltage input terminal 40. The N types of display regions include a g-th type of display region and an l-th type of display region, where $0<g\le N$, $0<l\le N$, g and l are integers, and $g\ne l$. In the same display frame, a start moment of an effective time period of sweep signals of light-emitting elements in the g-th type of display region is earlier than a start moment of an effective time period of sweep signals of light-emitting elements in the l-th type of display region (as shown in FIG. 24). The first display portion 100 includes at least one g-th type of display region and at least one l-th type display region, and in the first display portion 100, a ratio of the number of light-emitting elements included in the at least one g-th type of display region to the number of light-emitting elements included in the at least one l-th type display region is n1. The second display portion 200 includes at least one g-th type of display region and at least one l-th type display region, and in the second display portion, a ratio of the number of light-emitting elements included in the at least one g-th type of display region to the number of light-emitting elements included in the at least one l-th type display region is n2, where n1<n2. In this manner, in display regions which emit light first, relatively more light-emitting elements are located in a region farther away from the power supply voltage input terminal 40, and relatively less light-emitting elements are located in a region closer to the power supply voltage input terminal 40; and in display regions which emit light later, relatively less light-emitting elements are located in a region away farther from the power supply voltage input terminal 40, and relatively more light-emitting elements are located in a region closer to the power supply voltage input terminal 40. Therefore, when light-emitting elements which are farther away from the power supply voltage input terminal 40 emit light, voltage drops on the power supply voltage line are further reduced, and thus the uniformity of the display image of the display panel is improved. However, the present application does not limit this case, and the specific implementation may be designed according to actual situations.

Figure 27:
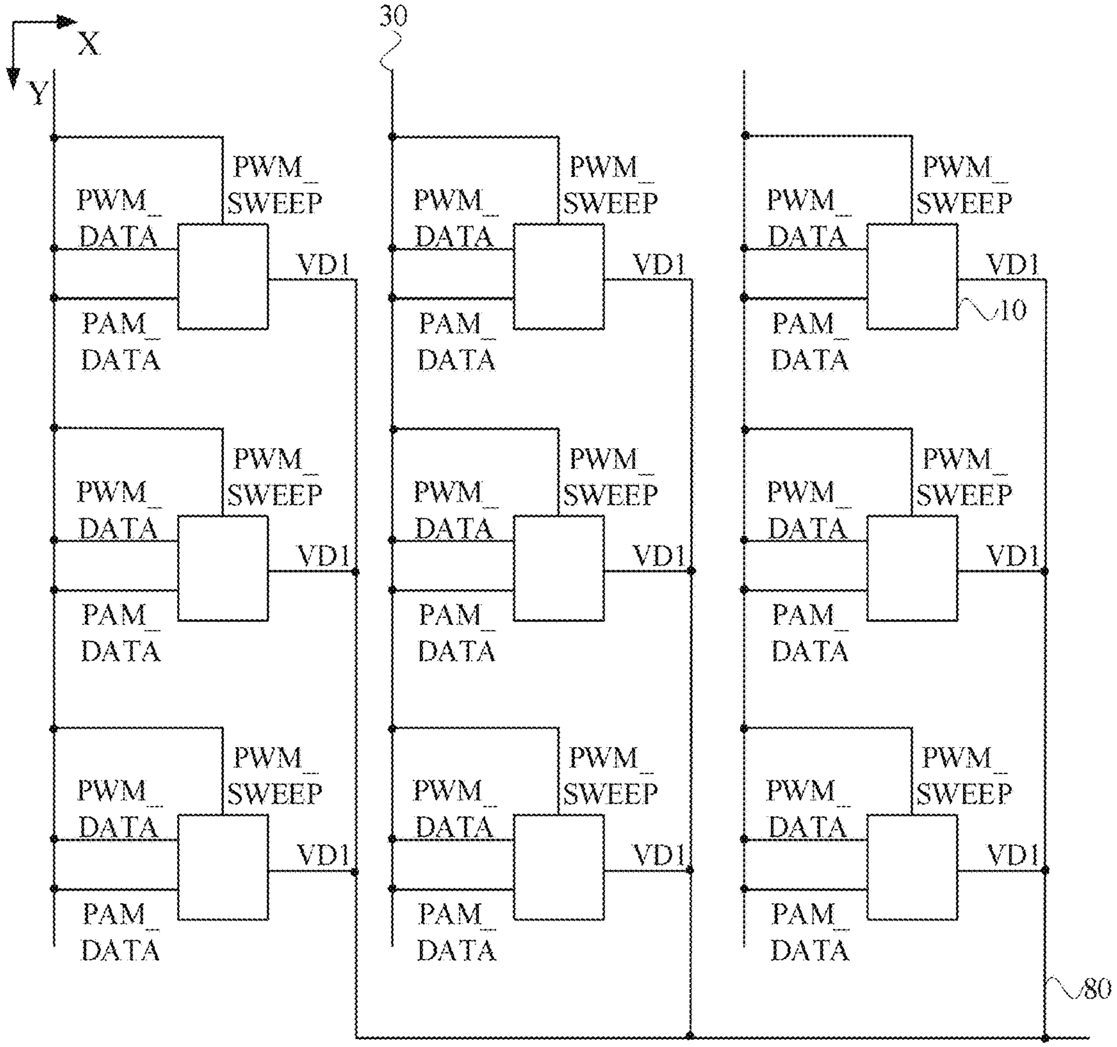
FIG. 27 is a structural diagram of another display panel according to an embodiment of the present disclosure.

In the preceding embodiment, sweep signal lines which extend along the row direction are disposed on the display panel, and different types of display regions include at least one row of sweep signal lines. In another embodiment, sweep signal lines may not be disposed, and data signal lines are configured to provide the same sweep signal for multiple pixel driving circuits along the column direction, that is, different types of display regions include at least one column of data signal line. FIG. 27 is a structural diagram of another display panel according to an embodiment of the present disclosure. Referring to FIG. 27, the display panel includes multiple light-emitting elements (not shown in FIG. 27) and multiple pixel driving circuits 10. For the specific structure of a pixel driving circuit 10, reference may be made to FIG. 16 and FIG. 19 and the description of FIG. 16 and FIG. 19. The pixel driving circuit 10 is electrically connected to the respective light-emitting element for driving the light-emitting element to emit light. The pixel driving circuit 10 includes a pulse width modulation module (no shown in FIG. 27), and the pixel driving circuit 10 includes a data signal terminal. The data signal terminal includes a pulse width data signal terminal PWM_DATA and an amplitude data signal terminal PAM_DATA. The pulse width modulation module includes a sweep signal terminal PWM_SWEEP, and the pulse width module is configured to control light emission duration of a light-emitting element. The display panel further includes multiple data signal lines 30 which are arranged along the first direction X and extend along the second direction Y. Data signal terminals (pulse width data signal terminals PWM_DATA and amplitude data signal terminals PAM_DATA) and sweep signal terminals PWM_SWEEP in multiple pixel driving circuits 10 which are arranged along the second direction Y are all electrically connected to one data signal line 30, and data signal lines 30 is configured to provide sweep signals for multiple sweep signal terminals PWM_SWEEP in the time division manner. The first direction X intercepts the second direction Y.

Figure 28:
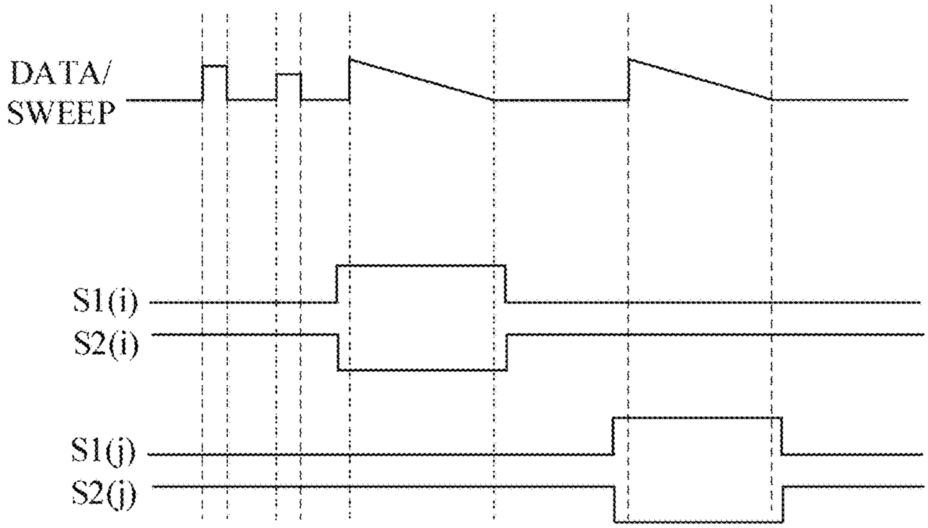
FIG. 28 is a timing diagram of data signal lines providing signals in the display panel in FIG. 27.

The pixel driving circuit 10 in the embodiment includes the pulse width modulation module and the amplitude modulation module, and the specific structures of the pulse width modulation module and the amplitude modulation module and definitions of various signal terminals are similar to the description in the preceding embodiments and are not repeated here. FIG. 28 is a timing diagram of data signal lines providing signals in the display panel in FIG. 27, and FIG. 28 does not shown the changes of scan signals in the pixel driving circuits. Referring to FIG. 28, the data signal line provides an amplitude data voltage signal for the amplitude modulation module in the pixel driving circuit first, then provides a pulse width data voltage signal for the pulse width modulation module, and provide a sweep signal for the pulse width modulation module. In the embodiment, one type of display region may be a row, scan signals for controlling the first transistor and the second transistor are applied individually to different types of display regions. S1(*i*) and S2(*i*) are scan signals corresponding to the first transistor and the second transistor, respectively, when controlling light-emitting elements of the i-th type of display region to emit light, and are configured to control the light-emitting elements of the i-th type of display region to emit light simultaneously. S1(*j*) and S2(*j*) are scan signals corresponding to the first transistor and the second transistor, respectively, when controlling light-emitting elements in the j-th type of display region to emit light, and are configured to control the light-emitting elements of the j-th type of display region to emit light simultaneously. In addition, different from the preceding embodiments, the scan signals controlling the first transistor and the second transistor need to change with different signals provided by the data signal lines, rather than change only once in the data writing stage and the light emission stage (that is, scan signals are provided as a whole) like in the preceding embodiments.

It is to be noted that in the embodiment, sweep signal terminals in the same column of pixel driving circuits are connected to the same data signal line, and all data signal lines are also used for providing sweep signals.

Figure 29:
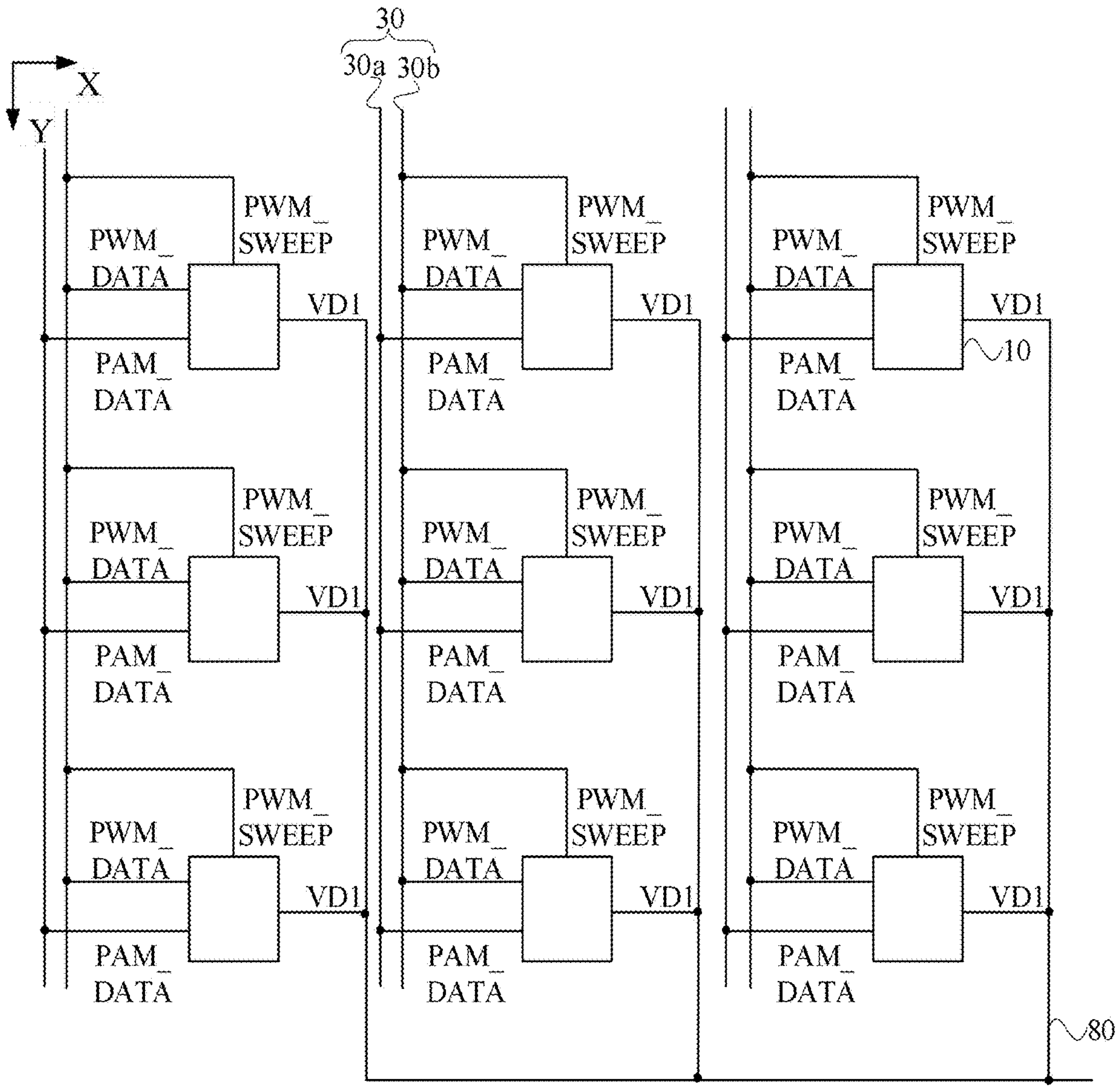
FIG. 29 is a structural diagram of another display panel according to an embodiment of the present disclosure.

In another embodiment, the amplitude data signal terminal of the amplitude modulation module and the pulse width data signal terminal of the pulse width modulation module may not share the same data signal line, and the sweep signal terminal may be connected to a certain data signal line. Exemplarily, FIG. 29 is a structural diagram of another display panel according to an embodiment of the present disclosure. Referring to FIG. 29, the data signal line 30 includes an amplitude data signal line 30*a* and a pulse width data signal line 30*b*. Amplitude data signal terminals PAM_DATA in pixel driving circuits 10 which are arranged along the second direction Y are connected to the amplitude data signal line 30*a*, and pulse width data signal terminals PWM_DATA and sweep signal terminals PWM_SWEEP in the pixel driving circuits 10 which are arranged along the second direction Y are all electrically connected to the pulse width data signal line 30*b*.

The timing of the pixel driving circuit in the embodiment of FIG. 29 is similar to the embodiment of FIG. 27. The difference is that in the embodiment of FIG. 29, the data signal line that provides the pulse width data signal is also used for providing the sweep signal, while a separate data signal line is used for providing the amplitude data signal. Therefore, the amplitude data signal and the pulse width data signal can be loaded simultaneously, which is not detailed here.

It is to be understood that in other embodiments, it may set that the amplitude data signal terminals PAM_DATA and the sweep signal terminals PWM_SWEEP in the pixel driving circuits 10 which are arranged along the second direction Y are all electrically connected to the amplitude data signal line 30*a*, and the implementation is similar to FIG. 29, which is not limited in the embodiment of the present disclosure.

An embodiment of the present disclosure further provides a pixel driving circuit, and the pixel driving circuit may be applied to the display panel provided in the preceding embodiments for driving a light-emitting element to emit light. With continued reference to FIG. 16, the pixel driving circuit provided in the embodiment includes a pulse width modulation module 11, and the pixel driving circuit includes a data signal terminal 101. The pulse width modulation module 11 includes a sweep signal terminal 111. The pulse width modulation module 11 further includes a first transistor T1 and a second transistor T2, a first terminal of the first transistor T1 is electrically connected to a fixed potential terminal VD1, a control terminal of the first transistor T1 is electrically connected to a first scan terminal S1, a second terminal of the first transistor T1 is electrically connected to the sweep signal terminal 111, a first terminal of the second transistor T2 is electrically connected to the data signal terminal 101, a second terminal of the second transistor T2 is electrically connected to the sweep signal terminal 111, and a control terminal of the second transistor T2 is electrically connected to a second scan terminal S2. An operation of the pixel driving circuit includes a data writing stage and a light emission stage. In the data writing stage, the first scan terminal S1 controls the first transistor T1 to be turned on, and the second scan terminal S2 controls the second transistor T2 to be turned off so that a data signal is provided for the data signal terminal 101. In the light emission stage, the first scan terminal S1 controls the first transistor T1 to be turned off, and the second scan terminal S2 controls the second transistor T2 to be turned on so that a sweep signal is provided for the sweep signal terminal 111.

In an example, when the pixel driving circuit is applied to the display panel, for the connection relationship between control signals of the first transistor T1 and the second transistor T2, reference may be made to the embodiments of FIG. 17 and FIG. 18, which is not detailed here.

An embodiment of the present disclosure further provides a driving method of a display panel applied to any display panel provided in the preceding embodiments. The display panel includes N types of display regions, the N types of display regions include an i-th type of display region and a j-th type of display region, and the driving method includes the step described below. During a first time period, light-emitting elements included in the i-th type of display region are controlled to emit light, and during a second time period, light-emitting elements included in the j-th type of display region are controlled to emit light, where the first time period and the second time period are at least partially non-overlapping. In this manner, during the same time period, the number of light-emitting elements driven by the power supply voltage line in the display panel is reduced, the increase in the instantaneous current on the power supply voltage line is reduced, voltage drops on the power supply voltage line are reduced, and the uniformity of the display image is improved.

Figure 30:
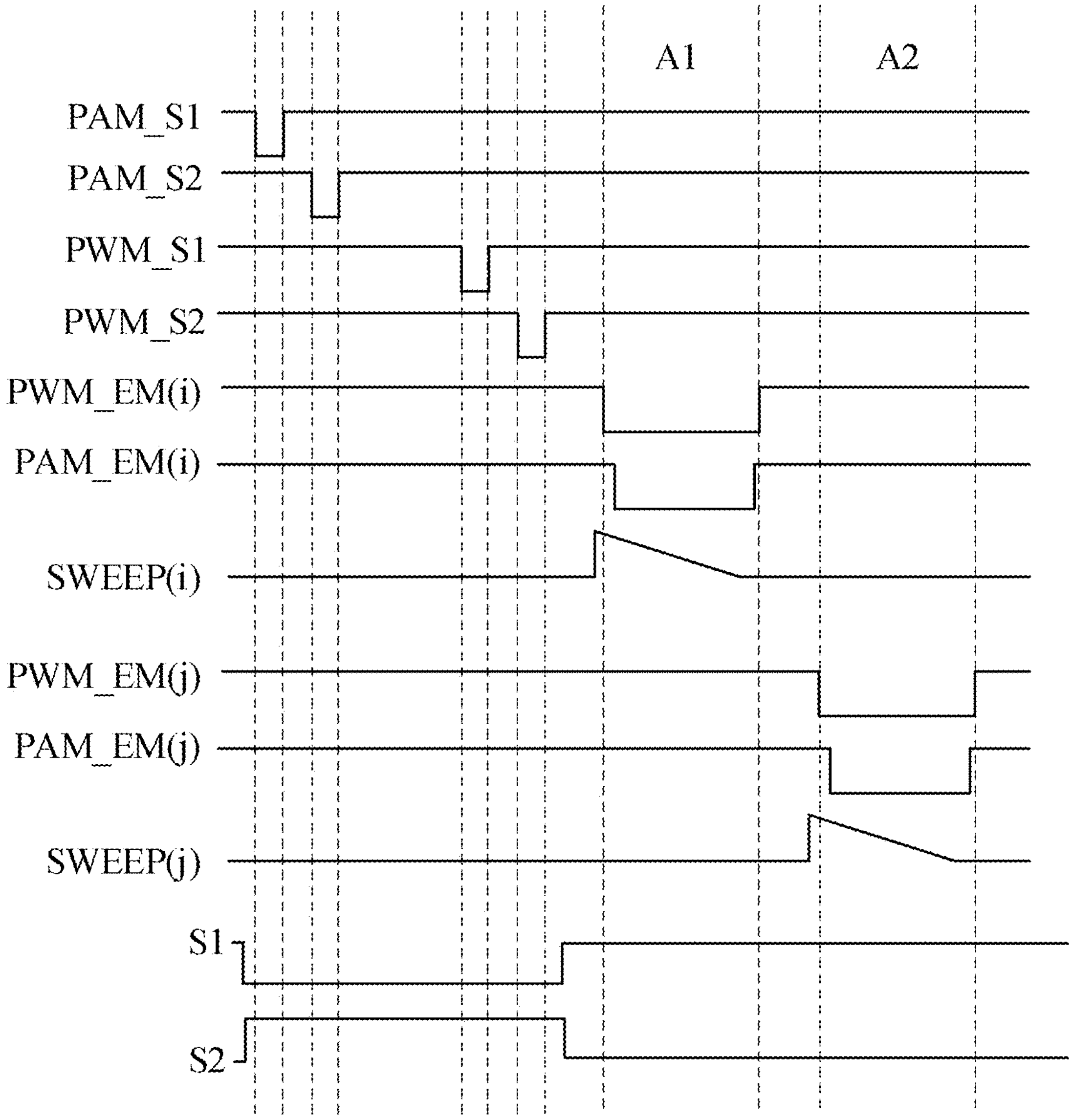
FIG. 30 is a driving timing diagram of a display panel according to an embodiment of the present disclosure.

FIG. 30 is a driving timing diagram of a display panel according to an embodiment of the present disclosure. Referring to FIG. 30, in an exemplary embodiment, the first time period A1 does not overlap the second time period A2, and the first time period A1 and the second time period A2 are two different light emission time periods. During the first time period A1, the light-emitting elements included in the i-th type of display region are controlled to emit light simultaneously, and during the second time period A2, the light-emitting elements included in the j-th type of display region are controlled to emit light simultaneously, which is conducive to improving the uniformity of the display image. A time period during which a second scan terminal S2 controls a second transistor T2 to be turned on may cover the first time period A1 and the second time period A2 in terms of timing. Therefore, S2 signals in various display regions may use the same signal, rather than having to be similar to light emission control signals which are correspondingly set for various types of display regions themselves.

In an exemplary embodiment, in a frame of display image, the light-emitting elements of the i-th type of display region are controlled to emit light during at least two first time periods, and the light-emitting elements of the j-th type of display region are controlled to emit light during at least two second time periods.

Figure 31:
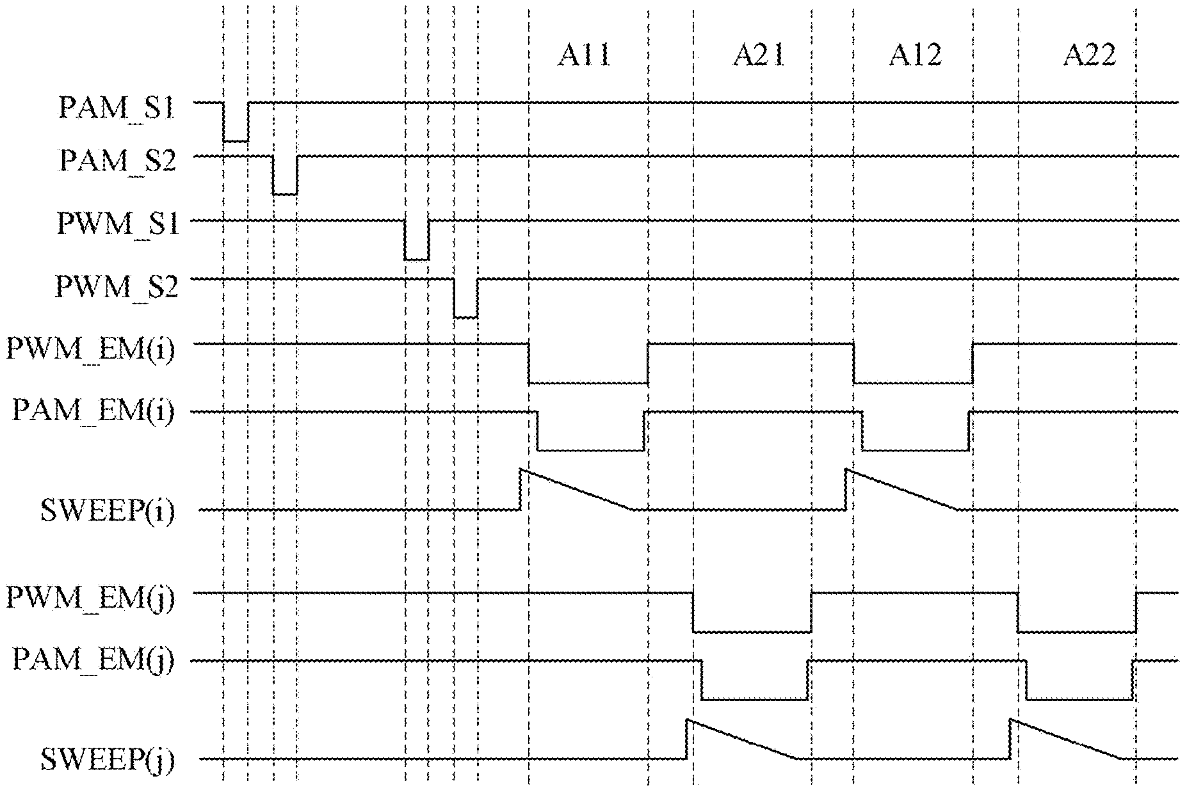
FIG. 31 is a driving timing diagram of another display panel according to an embodiment of the present disclosure.

Exemplarily, two first time periods and two second time periods are taken as an example. FIG. 31 is a driving timing diagram of another display panel according to an embodiment of the present disclosure. Referring to FIG. 31, in a frame of display image, the light-emitting elements of the i-th type of display region are controlled to emit light in first time periods A11 and A12, and the light-emitting elements of the j-th type of display region are controlled to emit light in second time periods A21 and A22, which, however, is not a limitation on the embodiment of the present disclosure.

With continued reference to FIG. 16 and FIG. 30, in an exemplary embodiment, the pixel driving circuit includes a pulse width modulation module 11 and an amplitude modulation module 12. When a light-emitting element 301 emits light, the pulse width modulation module 11 outputs a pulse width setting signal under control of a first light emission control signal (PWM_EM), and the amplitude modulation module 12 outputs a drive current under control of a second light emission control signal (PAM_EM). During the first time period A1, the first light emission control signal overlaps the second light emission control signal, during the second time period A2, the first light emission control signal overlaps the second light emission control signal, the first light emission control signal in the first time period A1 does not overlap the first light emission control signal in the second time period A2, and the second light emission control signal in the first time period A1 does not overlap the second light emission control signal in the second time period A2. The first light emission control signal and the second light emission control signal (PWP_EM(i) and PAM_EM(i)) which are located in the first time period A1 may be control signals used for controlling pixel driving circuits in the i-th type of display region; the first light emission control signal and the second light emission control signal (PWP_EM(j) and PAM_EM(j)) which are located in the second time period A2 may be control signals used for controlling pixel driving circuits in the j-th type of display region.

With continued reference to FIG. 16 and FIG. 21, in an exemplary embodiment, the pixel driving circuit includes a first transistor T1 and a second transistor T2, a first terminal of the first transistor T1 is electrically connected to a fixed potential terminal VD1, a control terminal of the first transistor T1 is electrically connected to a first scan terminal S1, a second terminal of the first transistor T2 is electrically connected to a sweep signal terminal 111, a first terminal of the second transistor T2 is electrically connected to a data signal terminal, a second terminal of the second transistor T2 is electrically connected to the sweep signal terminal 111, and a control terminal of the second transistor T2 is electrically connected to a second scan terminal S2. In a light emission stage of a light-emitting element, the second scan terminal S2 controls the second transistor T2 to be turned on so that a sweep signal provided by the data signal line is loaded on the sweep signal terminal 111.

Figure 32:
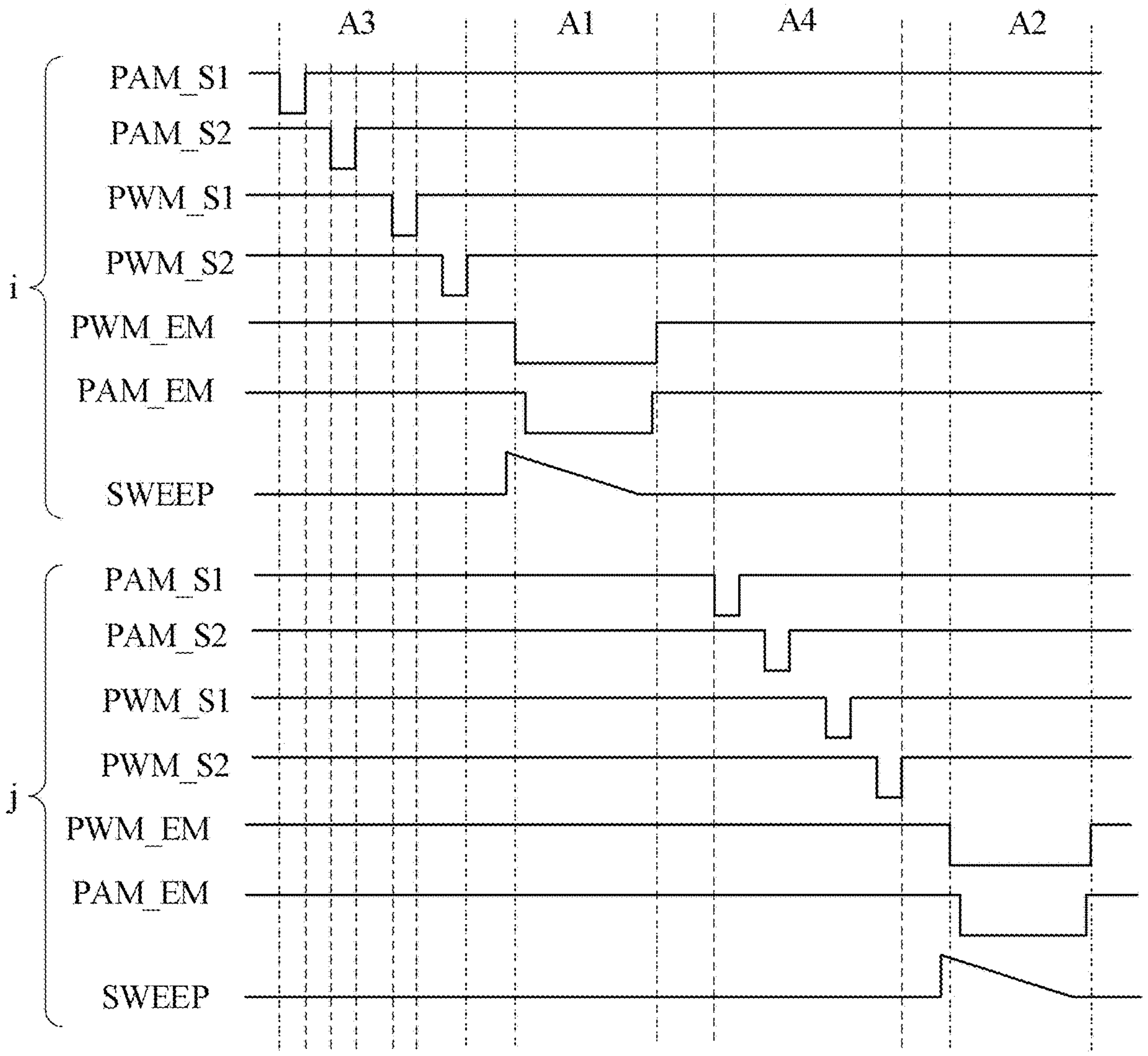
FIG. 32 is a driving timing diagram of another display panel according to an embodiment of the present disclosure.

In a certain embodiment, when the display panel display is controlled to display, for different display regions, processes of data writing, light emission, data writing, light emission, . . . may be sequentially performed. Exemplarily, FIG. 32 is a driving timing diagram of another display panel according to an embodiment of the present disclosure. Referring to FIG. 32, in an exemplary embodiment, the step in which in the first time period, the light-emitting elements included in the i-th type of display region are controlled to emit light, and in the second time period, the light-emitting elements included in the j-th type of display region are controlled to emit light includes steps described below. During a third time period A3, a data signal is written to light-emitting elements included in a first display portion; during the first time period A1, the light-emitting elements included in the i-th type of display region of the display panel are controlled to emit light; during a fourth time period A4, a data signal is written to light-emitting elements included in a second display portion; and during the second time period A2, the light-emitting elements included in the j-th type of display region of the display panel are controlled to emit light. A sequence of start moments of the time periods is: the third time period, the first time period, the fourth time period and the second time period. During the first time period, a data signal of the light-emitting elements included in the first display portion is a data signal of a current frame of display image, and a data signal of the light-emitting elements included in the second display portion is a data signal of a last frame of display image; and during the second time period, a data signal of the light-emitting elements included in the first display portion is data signal of a current frame of display image, and a data signal of the light-emitting elements included in the second display portion is a data signal of the current frame of display image.

It is to be noted that in the preceding embodiments, during the first time period, a data signal of the light-emitting elements included in the first display portion is a data signal of a current frame of display image, and a data signal of the light-emitting elements included in the second display portion is a data signal of a last frame of display image; and during the second time period, a data signal of the light-emitting elements included in the first display portion is a data signal of a current frame of display image, and a data signal of the light-emitting elements included in the second display portion is a data signal of the current frame of display image, so that the continuous display of display images is achieved.

Figure 33:
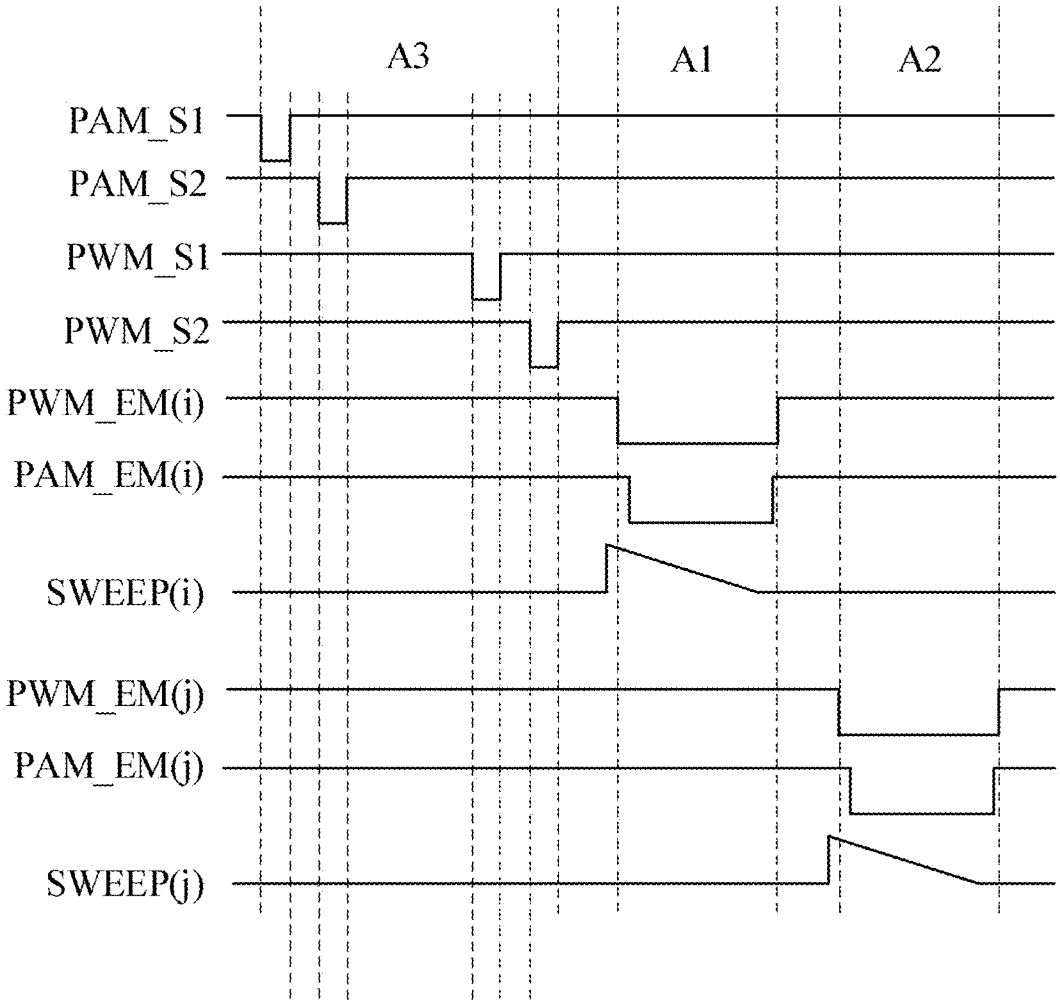
FIG. 33 is a driving timing diagram of another display panel according to an embodiment of the present disclosure.

In another embodiment, when the display panel is controlled to display, for different display regions, the process of data writing may be performed for all display regions first, and then the display regions are controlled to emit light sequentially. FIG. 33 is a driving timing diagram of another display panel according to an embodiment of the present disclosure. Referring to FIG. 33, in an exemplary embodiment, the step in which during the first time period, the light-emitting elements included in the i-th type of display region are controlled to emit light, and during the second time period, the light-emitting elements included in the j-th type of display region are controlled to emit light includes steps described below. During a third time period A3, a data signal is written to light-emitting elements included in a first display portion and light-emitting elements included in a second display portion; during the first time period A1, the light-emitting elements included in the i-th type of display region of the display panel are controlled to emit light; and during the second time period A2, the light-emitting elements included in the j-th type of display region of the display panel are controlled to emit light. A sequence of start moments of the time periods is: the third time period, the first time period and the second time period.

It is to be noted that when data signals are sequentially written to different display regions, timing of scan signals of the different display regions is the same. Therefore, FIG. 33 only shows one time of timing of scan signals.

Figure 34:
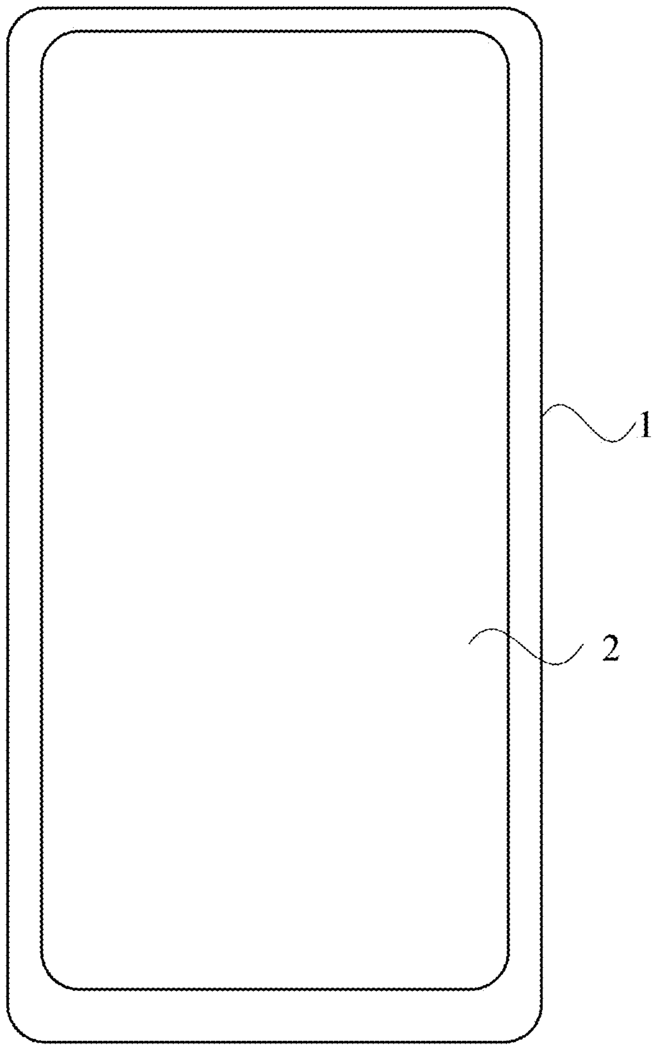
FIG. 34 is a structural diagram of a display device according to an embodiment of the present disclosure.

FIG. 34 is a structural diagram of a display device according to an embodiment of the present disclosure. Referring to FIG. 34, the display device 1 includes any display panel 2 provided in the embodiments of the present disclosure. The display device 1 may specifically be a large-sized display device such as a television, a monitor and public display, a small and medium-sized display device such as a mobile phone and a computer, or a micro display device such as a smart wearable device.

It is to be noted that the preceding are only preferred embodiments of the present disclosure and technical principles used therein. It is to be understood by those skilled in the art that the present disclosure is not limited to the embodiments described herein. For those skilled in the art, various apparent changes, readjustments and substitutions can be made without departing from the scope of the present disclosure. Therefore, while the present disclosure has been described in detail through the preceding embodiments, the present disclosure is not limited to the preceding embodiments and may include more other equivalent embodiments without departing from the concept of the present disclosure. The scope of the present disclosure is determined by the scope of the appended claims.

What is claimed is:

1. A display panel, comprising:

a light-emitting element and a pixel driving circuit, wherein the pixel driving circuit is electrically connected to the light-emitting element for driving the light-emitting element to emit light, wherein the pixel driving circuit comprises a pulse width modulation module and a data signal terminal, the pulse width modulation module comprises a sweep signal terminal, and the pulse width modulation module is configured to control light emission duration of the light-emitting element and receive a sweep signal through the sweep signal terminal;

a data signal line, wherein the data signal line is electrically connected to the data signal terminal and is configured to provide a data signal for the pixel driving circuit; and one of at least one data signal line is configured to provide a sweep signal for pulse width modulation modules connected to the data signal line providing the sweep signal.

2. The display panel according to claim 1, wherein the pixel driving circuit further comprises an amplitude modulation module, wherein the amplitude modulation module is configured to control an intensity of a drive current of the light-emitting element;

the data signal terminal comprises an amplitude data signal terminal which is located in the amplitude modulation module and a pulse width data signal terminal which is located in the pulse width modulation module; and one of at least one sweep signal terminal is connected to a same data signal line as at least one in an amplitude data signal terminal or a pulse width data signal terminal, wherein the amplitude data signal terminal and the pulse width data signal terminal are in the same pixel driving circuit.

3. The display panel according to claim 2, wherein the amplitude data signal terminal and the pulse width data signal terminal in the same pixel driving circuit are connected to the same data signal line.

4. The display panel according to claim 3, wherein an operation of the pixel driving circuit comprises a data writing stage, the data writing stage comprises an amplitude data writing stage and a pulse width data writing stage which are performed simultaneously.

5. The display panel according to claim 2, wherein the amplitude data signal terminal is configured to receive an amplitude data signal, and the pulse width data signal terminal is configured to receive a pulse width data signal; and a data signal line that provides the pulse width data signal is configured to provide the sweep signal, and a separate data signal line is configured to provide the amplitude data signal; or a data signal line that provides the amplitude data signal is configured to provide the sweep signal, and a separate data signal line is configured to provide the pulse width data signal.

6. The display panel according to claim 5, wherein an operation of the pixel driving circuit comprises a data writing stage, the data writing stage comprises an amplitude data writing stage and a pulse width data writing stage which are performed simultaneously or separately.

7. The display panel according to claim 1, wherein all data signal lines are configured to provide data signals and sweep signals.

8. The display panel according to claim 1, wherein the pulse width modulation module further comprises a first transistor and a second transistor, a first terminal of the first transistor is electrically connected to a fixed potential terminal, a control terminal of the first transistor is electrically connected to a first scan terminal, a second terminal of the first transistor is electrically connected to the sweep signal terminal, a first terminal of the second transistor is electrically connected to the data signal terminal, a second terminal of the second transistor is electrically connected to the sweep signal terminal, and a control terminal of the second transistor is electrically connected to a second scan terminal; and an operation of the pixel driving circuit comprises a data writing stage and a light emission stage, wherein in the data writing stage, the first scan terminal is configured to control the first transistor to be turned on, and the second scan terminal is configured to control the second transistor to be turned off so that a data signal is provided for the data signal terminal; and in the light emission stage, the first scan terminal is configured to control the first transistor to be turned off, and the second scan terminal is configured to control the second transistor to be turned on so that a sweep signal is provided for the sweep signal terminal.

9. The display panel according to claim 8, wherein, the first transistor T1 and the second transistor T2 are different types of transistors and are configured to receive a same scan signal; or the first transistor T1 and the second transistor T2 are same types of transistors and are configured to receive an inverse scan signal.

10. The display panel according to claim 1, wherein the data signal line of at least one data signal line is configured to provide the data signal and the sweep signal in a time-division manner.

11. The display panel according to claim 1, wherein, the pixel driving circuit further comprises an amplitude modulation module, the amplitude modulation module comprises a drive transistor, the pulse width modulation module is connected to a control terminal of the drive transistor; or the pixel driving circuit further comprises an amplitude modulation module, the amplitude modulation module comprises a drive transistor and a pulse width modulation transistor, the pulse width modulation module is connected to a control terminal of the pulse width modulation transistor.

12. The display panel according to claim 1, wherein the pixel driving circuit further comprises an amplitude modulation module, the amplitude modulation module comprises an amplitude drive transistor and a first control transistor, and the pulse width modulation module comprises a pulse width drive transistor and a second control transistor;

a first terminal of the first control transistor is configured to receive an amplitude data signal, and a second terminal of the first control transistor is connected to a first terminal of the amplitude drive transistor; and a first terminal of the second control transistor is configured to receive a pulse width data signal, and a second terminal of the second control transistor is connected to a first terminal of the pulse width drive transistor.

13. The display panel according to claim 1, wherein at least two types of data signal lines are provided, different types of data signal lines are configured to provide sweep signals for corresponding sweep signal terminals at different times; or different types of data signal lines are configured to provide sweep signals for corresponding sweep signal lines at different rates of change; or different types of data signal lines are configured to provide sweep signals for corresponding sweep signal lines at different times and different rates of change.

14. A display device, comprising the display panel according to claim 1.

15. A display panel, comprising a light-emitting element and a pixel driving circuit, wherein the pixel driving circuit is electrically connected to the light-emitting element for driving the light-emitting element to emit light, wherein the pixel driving circuit comprises a pulse width modulation module, the pulse width modulation module comprises a sweep signal terminal, and the pulse width modulation module is configured to control light emission duration of the light-emitting element;

a sweep signal line, the sweep signal line is electrically connected to the sweep signal terminal and is configured to provide a sweep signal for the pulse width modulation module; and at least one of following manners is provided:

durations of sweep signals provided by at least two of sweep signal lines are different; or, rates of change of sweep signals are different.

16. The display panel according to claim 15, wherein the sweep signals are at least partially non-overlapping in timing.

17. The display panel according to claim 15, wherein, pixel driving circuits corresponding to light-emitting elements with different emission wavelengths are configured to receive different sweep signals; or pixel driving circuits corresponding to light-emitting elements at different positions are configured to receive different sweep signals.

18. The display panel according to claim 15, further comprises a data signal line, wherein the pixel driving circuit further comprises a data signal terminal, the data signal line is electrically connected to the data signal terminal, and the data signal line is configured to provide a data signal for the pixel driving circuit; the data signal terminal comprises an amplitude data signal terminal which is located in the amplitude modulation module and a pulse width data signal terminal which is located in the pulse width modulation module;

the amplitude data signal terminal is configured to receive a amplitude data signal, and the pulse width data signal terminal is configured to receive a pulse width data signal;

the data signal line provides a sweep signal and one of the amplitude data signal and the pulse width data signal.

19. A display device, comprising the display panel according to claim 15.

20. A display panel, comprising a light-emitting element and a pixel driving circuit, wherein the pixel driving circuit is electrically connected to the light-emitting element for driving the light-emitting element to emit light;

wherein the pixel driving circuit comprises a pulse width modulation module and a data signal terminal, the pulse width modulation module comprises a sweep signal terminal;

wherein the pulse width modulation module further comprises a first transistor and a second transistor, a first terminal of the first transistor is electrically connected to a fixed potential terminal, a control terminal of the first transistor is electrically connected to a first scan terminal, a second terminal of the first transistor is electrically connected to the sweep signal terminal, a first terminal of the second transistor is electrically connected to the data signal terminal, a second terminal of the second transistor is electrically connected to the sweep signal terminal, and a control terminal of the second transistor is electrically connected to a second scan terminal; and an operation of the pixel driving circuit comprises a data writing stage and a light emission stage, wherein in the data writing stage, the first scan terminal controls the first transistor to be turned on, and the second scan terminal controls the second transistor to be turned off so that a data signal is provided for the data signal terminal; and in the light emission stage, the first scan terminal controls the first transistor to be turned off, and the second scan terminal controls the second transistor to be turned on so that a sweep signal is provided for the sweep signal terminal.

* * * * *